(12) United States Patent
Shinmei et al.

(10) Patent No.: US 10,256,497 B2
(45) Date of Patent: Apr. 9, 2019

(54) ELECTROLYTE, ELECTROLYTE SOLUTION, GEL ELECTROLYTE, ELECTROLYTE MEMBRANE, METHOD FOR MANUFACTURING GEL ELECTROLYTE BATTERY, AND LITHIUM ION SECONDARY BATTERY

(75) Inventors: Kenichi Shinmei, Tsukuba (JP); Yoshiharu Konno, Tsukuba (JP); Masashi Kanoh, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 660 days.

(21) Appl. No.: 13/824,662

(22) PCT Filed: Sep. 26, 2011

(86) PCT No.: PCT/JP2011/071927
§ 371 (c)(1),
(2), (4) Date: May 28, 2013

(87) PCT Pub. No.: WO2012/039500
PCT Pub. Date: Mar. 29, 2012

(65) Prior Publication Data
US 2013/0280618 A1 Oct. 24, 2013

(30) Foreign Application Priority Data

Sep. 24, 2010 (JP) .................................. 2010-213775
Mar. 4, 2011 (JP) .................................. 2011-047620
(Continued)

(51) Int. Cl.
*H01M 10/0567* (2010.01)
*H01M 10/0568* (2010.01)
(Continued)

(52) U.S. Cl.
CPC ............ *H01M 10/04* (2013.01); *H01B 1/122* (2013.01); *H01G 11/26* (2013.01); *H01G 11/46* (2013.01);
(Continued)

(58) Field of Classification Search
CPC ......... H01M 10/0565; H01M 10/0525; H01M 10/04
(Continued)

(56) References Cited

U.S. PATENT DOCUMENTS 6,022,643 A * 2/2000 Lee ..................... H01M 4/5815
429/303
6,045,948 A * 4/2000 Wang ................ H01M 10/0567
429/199

(Continued)

FOREIGN PATENT DOCUMENTS

CN 1115323 A 1/1996
CN 1700501 A 11/2005
(Continued)

OTHER PUBLICATIONS

Patrick E. Trapa et al., Synthesis and Characterization of Single-Ion Graft Copolymer Electrolytes, Journal of the Electrochemical Society, U.S. The Electrochemical Society, Inc., Oct. 13, 2005, vol. 152, Issue 12, pp. A2281-A2284.

(Continued)

*Primary Examiner* — James Lee
(74) *Attorney, Agent, or Firm* — Greenblum & Bernstein P.L.C.

(57) ABSTRACT

The present invention includes an electrolyte in which an organic acid lithium salt (A) and a boron compound (B) are mixed.

5 Claims, 1 Drawing Sheet

(30) Foreign Application Priority Data

| May 31, 2011 | (JP) | 2011-122453 |
|---|---|---|
| Jun. 30, 2011 | (JP) | 2011-145438 |
| Jul. 6, 2011 | (JP) | 2011-150146 |

(51) Int. Cl.

| *H01M 10/0569* | (2010.01) |
|---|---|
| *H01M 10/04* | (2006.01) |
| *H01B 1/12* | (2006.01) |
| *H01G 11/26* | (2013.01) |
| *H01G 11/46* | (2013.01) |
| *H01M 10/0525* | (2010.01) |
| *H01M 10/0565* | (2010.01) |
| *H01M 10/0585* | (2010.01) |
| *H01G 11/52* | (2013.01) |
| *H01G 11/56* | (2013.01) |
| *H01M 4/485* | (2010.01) |
| *H01M 4/505* | (2010.01) |
| *H01M 4/525* | (2010.01) |
| *H01M 4/587* | (2010.01) |

(52) U.S. Cl.
CPC ............ *H01G 11/52* (2013.01); *H01G 11/56* (2013.01); *H01M 10/0525* (2013.01); *H01M 10/0565* (2013.01); *H01M 10/0567* (2013.01); *H01M 10/0568* (2013.01); *H01M 10/0569* (2013.01); *H01M 10/0585* (2013.01); *H01M 4/485* (2013.01); *H01M 4/505* (2013.01); *H01M 4/525* (2013.01); *H01M 4/587* (2013.01); *H01M 2300/0085* (2013.01); *Y02E 60/13* (2013.01)

(58) Field of Classification Search
USPC ................ 429/303, 188, 199–200, 343, 337, 429/339–341; 427/58
See application file for complete search history.

(56) References Cited

U.S. PATENT DOCUMENTS

| 8,986,896 | B2 | 3/2015 | Fujinami et al. | |
|---|---|---|---|---|
| 2002/0031710 | A1* | 3/2002 | Kezuka | H01M 10/0565 429/303 |
| 2002/0160273 | A1 | 10/2002 | Arai et al. | |
| 2004/0053139 | A1 | 3/2004 | Arai et al. | |
| 2005/0171383 | A1 | 8/2005 | Arai et al. | |
| 2006/0019161 | A1 | 1/2006 | Issaev et al. | |
| 2006/0068295 | A1 | 3/2006 | Xu et al. | |
| 2006/0068296 | A1 | 3/2006 | Nakagawa et al. | |
| 2011/0008685 | A1* | 1/2011 | Fujinami | H01M 10/0568 429/345 |
| 2011/0027657 | A1* | 2/2011 | Nishinaka | H01M 4/62 429/246 |

FOREIGN PATENT DOCUMENTS

| CN | 101104722 A | 1/2008 |
|---|---|---|
| CN | 101567472 A | 10/2009 |
| JP | H01-503425 A | 11/1989 |
| JP | 10-50345 A | 2/1998 |
| JP | 2000-149985 | 5/2000 |
| JP | 2000-214448 | 8/2000 |
| JP | 3157209 B2 | 4/2001 |
| JP | 2001-185210 | 7/2001 |
| JP | 2001-250583 | 9/2001 |
| JP | 2002-193973 A | 7/2002 |
| JP | 2002-313428 A | 10/2002 |
| JP | 3369583 B2 | 1/2003 |
| JP | 2003-272703 A | 9/2003 |
| JP | 2004-259682 A | 9/2004 |
| JP | 2005-093376 A | 4/2005 |
| JP | 2006-172983 A | 6/2006 |
| JP | 2006-318674 A | 11/2006 |
| JP | 2007-122902 A | 5/2007 |
| JP | 2007-231189 A | 9/2007 |
| JP | 2008-218404 | 9/2008 |
| JP | 2008-231408 A | 10/2008 |
| JP | 2008-310981 A | 12/2008 |
| JP | 4407205 B2 | 2/2010 |
| WO | 88/08612 A1 | 11/1988 |
| WO | 2010/029971 A1 | 3/2010 |
| WO | 2012/090575 A1 | 7/2012 |

OTHER PUBLICATIONS

Japanese Office Action issued with respect to Japanese Application No. 2012-535091, dated Jul. 30, 2013.
Japanese Office Action issued with respect to application No. 2011-140519, dated Dec. 19, 2014.
European Search Report issued with respect to application No. 11826942.2, dated Jan. 5, 2015.
Taiwanese Office Action issued with respect of application No. 100134721, dated Mar. 25, 2015.
Chinese Office Action issued for application No. 201180056373.5, dated Dec. 3, 2014.
Masayoshi Watanabe et al., "Single ion conduction in polyether electrolytes alloyed with Lithium salt of a perfluorinated polyimide", Electrochimica Acta., vol. 45, 2000, pp. 1187-1192.
Masayoshi Watanabe et al., "Single ion conduction in polyether electrolytes alloyed with Lithium salt of a per?uorinated polyimide", Electrochimica Acta., vol. 45, 2000, pp. 1187-1192.
Masayoshi Watanabe et al., "Anionic effect on ion transport properties in network Polyether electrolytes", Electrochimica Acta., vol. 46, 2001, pp. 1487-1491.
Search report from International Patent Appl. No. PCT/JP2011/071927, dated Dec. 27, 2011.

* cited by examiner

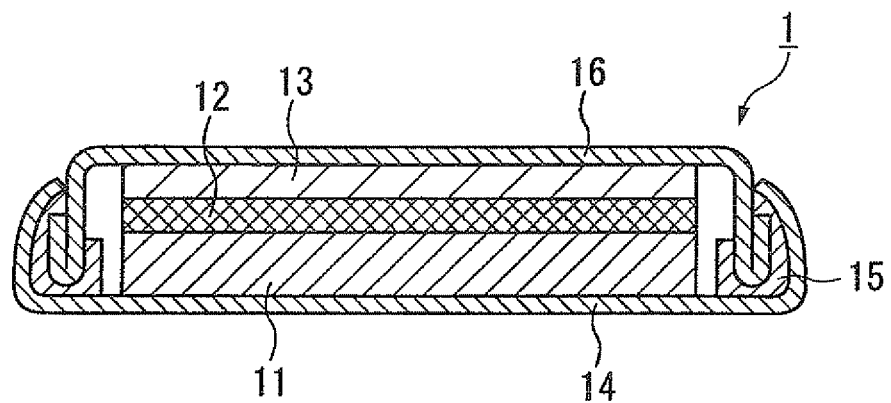

ELECTROLYTE, ELECTROLYTE SOLUTION, GEL ELECTROLYTE, ELECTROLYTE MEMBRANE, METHOD FOR MANUFACTURING GEL ELECTROLYTE BATTERY, AND LITHIUM ION SECONDARY BATTERY

TECHNICAL FIELD

The present invention relates to an electrolyte, an electrolytic solution using the electrolyte, a gel electrolyte using the electrolytic solution, an electrolyte membrane, a method for manufacturing a gel electrolyte battery, and a lithium ion secondary battery.

Priority is claimed on Japanese Patent Application No. 2010-213775, filed Sep. 24, 2010, Japanese Patent Application No. 2011-47620, filed Mar. 4, 2011, Japanese Patent Application No. 2011-122453, filed May 31, 2011, Japanese Patent Application No. 2011-145438, filed Jun. 30, 2011, and Japanese Patent Application No. 2011-150146, filed Jul. 6, 2011, the contents of which are incorporated herein by reference.

BACKGROUND ART

Lithium ion secondary batteries have characteristics of high energy density and electromotive force compared to lead storage batteries and nickel-hydrogen batteries, and thus have been widely used as a power supply of a mobile phone, a notebook PC, and the like in which a reduction in size and weight is required.

In general, a number of lithium ion secondary batteries in the related art are constituted by a negative electrode, a positive electrode, and a separator that prevents a short-circuit between both of the electrodes, and an electrolytic solution is maintained by the separator.

In the lithium ion secondary battery, commonly, for the negative electrode, metal lithium, a lithium alloy, a carbon-based material, a metal oxide, and the like that are capable of intercalating and deintercalating lithium are used. In addition, for the positive electrode, transition metal oxides such as lithium cobaltate, lithium nickelate, lithium manganate, and olivine type lithium iron phosphate are used.

In addition, in a number of current lithium ion secondary batteries, as an electrolytic solution, a nonaqueous electrolytic solution, which is obtained by dissolving a lithium salt such as lithium hexafluorophosphate ($LiPF_6$), lithium boron tetrafluoride ($LiBF_4$), bis(trifluoromethyl sulfonyl)imide lithium ($LiN(SO_2CF_3)_2$), lithium hexafluorophosphate ($LiPF_6$), lithium perchlorate ($LiClO_4$), lithium boron tetrafluoride ($LiBF_4$), lithium trifluoromethanesulfonate ($LiCF_3SO_3$), lithium hexafluoroantimonate ($LiSbF_6$), lithium hexafluoroarsenate ($LiAsF_6$), and lithium tetraphenylborate ($LiB(C_6H_5)_4$) in various organic solvents such as ethylene carbonate, propylene carbonate, gamma butyrolactone, methyl carbonate, ethyl methyl carbonate, and ethyl carbonate, is used (for example, refer to PTL 1 to PTL 3).

CITATION LIST

Patent Literature

[PTL 1] Japanese Patent No. 3157209
[PTL 2] Japanese Patent No. 3369583
[PTL 3] Japanese Patent No. 4407205

SUMMARY OF INVENTION

Problems to be Solved by the Invention

In the lithium salts, characteristics such as easy dissolution in an organic solvent, high chemical stability and thermal stability, and low cost are required, but it is very difficult to satisfy all of the requirements. For example, $LiPF_6$ used in a commercially available battery has a problem of being thermally unstable and easy to be hydrolyzed, and $LiN(SO_2CF_3)_2$ used in a commercially available battery has a problem of high cost.

Particularly, in an aspect of the thermal stability, $LiPF_6$ is thermally decomposed at 60° C. or higher, and thus it is necessary for the upper limit temperature of the battery to be set to be approximately from 40° C. to 50° C.

On the other hand, in addition to these representative lithium salts, organic acid lithium salts such as lithium acetate and lithium propionate are known. However, these lithium salts are hardly dissolved in an organic solvent, and thus are not used as a lithium salt for a lithium ion secondary battery.

In addition, in a case where a lithium ion secondary battery is used as a power supply of an electric bicycle or an electric vehicle, it is necessary to shorten a charging time, that is, it is necessary to increase rapid charging characteristics. A common lithium ion secondary battery is used under charging conditions in which the battery is fully charged in 1 to 5 hours. However, when the charging time is shortened to be approximately 15 minutes, the convenience of the lithium ion secondary battery may be largely increased.

However, for example, when the lithium ion secondary battery in the related art is rapidly charged under conditions in which full charging is made in 15 minutes, significant deterioration in battery characteristics is caused, and thus capacity deterioration due to repetitive charging and discharging is caused. That is, there is a problem in that cycle lifetime characteristics decreases due to the repetition of charging and discharging.

The invention relates to an electrolyte, an electrolytic solution, a gel electrolyte, an electrolyte membrane, a method for manufacturing a gel electrolyte battery, and a lithium ion secondary battery, and an object thereof is to provide an electrolyte that suppresses capacity deterioration due to repetition of charging and discharging, that is, an electrolyte excellent in cycle lifetime characteristics.

In addition, a relatively specific object of the invention is to provide an electrolyte which has the same ion conductivity as an electrolyte using a lithium salt in the related art, and which is excellent in lithium ion transference number.

Means for Solving the Problem

The invention has the following aspects.

(1) An electrolyte in which an organic acid lithium salt (A) and a boron compound (B) are mixed.

(2) The electrolyte according to (1), wherein the organic acid lithium salt (A) may be at least one kind selected from a carboxylic acid lithium salt and a sulfonic acid lithium salt.

(3) The electrolyte according to (1) or (2), wherein the boron compound (B) may be one or more kinds selected from the group consisting of boron halide, a boron halide alkylether complex, a boron halide alcohol complex, 2,4,6-trialkoxy boroxine, trialkyl borate, triaryl borate, and tris (trialkylsilyl) borate.

(4) The electrolyte according to any one of (1) to (3), wherein the ratio of the number of moles of lithium atoms in the organic acid lithium salt (A) to the number of moles of the boron compound (B) may be from 100:30 to 100:150 (molar ratio).

(5) An electrolytic solution in which the electrolyte according to any one of (1) to (4) and an organic solvent (C) are mixed.

(6) The electrolytic solution according to (5), wherein the organic solvent (C) may be one or more kinds selected from the group consisting of a carbonic acid ester compound, a lactone compound, an ether compound, a carboxylic acid ester compound, a nitrile compound, an amide compound, and a sulfone compound.

(7) A gel electrolyte in which the electrolyte according to any one of (1) to (4) and a matrix polymer (D) are mixed.

(8) A gel electrolyte in which the electrolyte according to (5) or (6) and a matrix polymer (D) are mixed.

(9) The gel electrolyte according to (7) or (8), wherein the matrix polymer (D) is one or more kinds selected from the group consisting of a polyether-based polymer, a fluorine-based polymer, a polyacrylic polymer, polyacrylonitrile, polyphosphazen, and polysiloxane.

(10) An electrolyte membrane that is obtained using the electrolyte according to any one of (1) to (4), and the gel electrolyte according to any one of (7) to (9).

(11) The electrolyte according to (1), wherein the matrix polymer (D) is further mixed.

(12) A method for manufacturing a gel electrolyte battery in which a positive electrode plate and a negative electrode plate are laminated with a gel electrolyte layer therebetween the method comprising the step of:

forming a gel electrolyte layer using a coating liquid prepared by mixing and warming the gel electrolyte according to any one of (7) to (9).

(13) The method for manufacturing a gel electrolyte battery according to (12), wherein in the forming of the gel electrolyte layer, the coating liquid is warmed to 60° C. or higher.

(14) A lithium ion secondary battery that is obtained using the electrolytic solution or the gel electrolyte according to any one of (4) to (9).

(15) A lithium ion secondary battery that is obtained using the method for manufacturing a gel electrolyte battery according to (12) or (13).

Effect of Invention

According to the invention, an organic acid lithium salt, which has been considered as a component not capable of being used in a lithium ion secondary battery in the related art, is used in combination with a boron compound. Accordingly, an electrolyte, which is sufficiently dissolved in various organic solvents, and has sufficient charging and discharging characteristics, that is, excellent cycle lifetime characteristics, may be provided.

In addition, since the electrolyte using the organic acid lithium salt is thermally stable, even when an environment under which the lithium ion secondary battery using the electrolyte is used is 50° C. or higher, battery performance does not vary.

BRIEF DESCRIPTION OF DRAWING

FIG. 1 is a diagram illustrating an embodiment of a lithium ion secondary battery of the invention.

EMBODIMENT OF THE INVENTION

<Electrolyte>

In the electrolyte of the invention, an organic acid lithium salt (A) and a boron compound (B) are mixed. When the boron compound (B) is used in combination, solubility of the organic acid lithium salt (A) with respect to an organic solvent is largely improved. Accordingly, the electrolyte in which these components are mixed has sufficient performance when repetitively performing charging and discharging, and may be very appropriate for application to a lithium ion secondary battery.

(Organic Acid Lithium Salt (A))

The organic acid lithium salt (A) is not particularly limited as long as an acid group of the organic acid constitutes a lithium salt. Examples of a group constituting the organic acid include a carboxyl group, a sulfone group, and a hydroxyl group such as a hydrooxyphenyl group exhibiting a weak acidity, and the like. As the organic acid lithium salt (A), a carboxylic acid lithium salt or a sulfonic acid lithium salt is preferable, and the carboxylic acid lithium salt is more preferable. The reason why the carboxylic acid lithium salt (A) is preferable as the organic acid lithium slat is assumed to be because an electric charge of a carboxyl group is relatively localized, and thus when being combined with the boron compound (B), there is a tendency for the carboxylic acid lithium salt to interact with the boron compound (B), and the carboxylic acid lithium salt may further disperse or dissolve the organic acid lithium salt (A).

In addition, in the organic acid lithium salt (A), the number of acid groups constituting the lithium salt is not particularly limited. For example, in a case where the organic acid is carboxylic acid, it is preferable that the number of carboxyl groups of the carboxylic acid be 1 to 4. Within this range, solubility of the organic acid lithium salt (A) in a nonaqueous solvent is further improved.

The carboxylic acid lithium salt may be a lithium salt of aliphatic carboxylic acid, alicyclic carboxylic acid, or aromatic carboxylic acid, and may be a lithium salt of monovalent carboxylic acid or polyvalent carboxylic acid. It is preferable that the carboxylic acid lithium salt be a straight-chain or branched-chain carboxylic acid lithium salt, and more preferably lithium salt of saturated carboxylic acid (carboxylic acid not having an unsaturated bond as a bond between carbon atoms). In addition, it is preferable that the carboxylic acid lithium salt have a carbon number of 1 to 20, and more preferably a carbon number of 1 to 10. Still more preferably, the carboxylic acid lithium salt is a lithium salt of aliphatic carboxylic acid having a carbon number of 1 to 6 or a lithium salt of aromatic carboxylic acid having a carbon number of 7 to 8.

The reason why the carboxylic acid lithium salt preferably has a carbon number of 1 to 20 is that when the carbon number is set to be 20 or less, the organic acid lithium salt may be dispersed or dissolved in an organic solvent.

Specifically, preferred examples carboxylic acid lithium salt include lithium formate, lithium acetate, lithium propionate, lithium butyrate, lithium isobutyrate, lithium valerate, lithium isovalerate, lithium oxalate, lithium lactate, lithium tartrate, lithium maleate, lithium fumarate, lithium malonate, lithium succinate, lithium malate, lithium citrate, lithium glutarate, lithium adipate, lithium phthalate, lithium benzoate, lithium caproate, lithium enanthate, lithium caprylate, lithium pelargonate, lithium caprate, lithium laurate, lithium myristate, lithium pentadecylate, lithium palmitate, lithium oleate, and lithium linoleate.

In addition, more preferred examples of the carboxylic acid lithium salt include lithium formate, lithium acetate, lithium oxalate, lithium malonate, and lithium succinate. In the invention, the reason why the organic acid lithium salt (A) is preferably lithium formate, lithium acetate, lithium oxalate, lithium malonate, or lithium succinate is that when lithium formate, lithium acetate, lithium oxalate, lithium malonate, or lithium succinate is used, a satisfactory solid electrolyte interface (SEI) is formed on a surface of a negative electrode, and thus satisfactory cycle characteristics are shown.

In a case where the organic acid constituting the lithium salt exemplified in this specification is a polyvalent carboxylic acid, as the lithium salt, a salt that contains Li atoms in the same number or less as the valence. For example, since the oxalic acid is divalent carboxylic acid, as a lithium salt of oxalic acid, "monolithium oxalate (lithium hydrogen oxalate)" and "dilithium oxalate (2 lithium oxalate)" may be exemplified, but these are referred to as simply "oxalic acid lithium salt". That is, in the specification and claims, a lithium salt of any organic acid is referred to as simply "organic acid lithium" regardless of the valence thereof unless otherwise stated.

The organic acid lithium salt (A) may be used alone or in combination of two or more kinds. In a case where two or more kinds are used in combination, the combination and ratio thereof may be appropriately selected according to a purpose.

A mixed amount of the organic acid lithium salt (A) is not particularly limited, and may be appropriately adjusted according to a kind thereof. However, commonly, it is preferable that the mixed amount be adjusted so that a molar concentration of lithium atoms in the organic acid lithium salt (A) in the electrolyte ([the number of moles of lithium atoms in the organic acid lithium salt (A)]/[total amount (kg) of electrolyte]) becomes 0.1 to 10 mol/kg, more preferably 0.2 to 5.0 mol/kg, still more preferably 0.3 to 3.0 mol/kg, and still more preferably 0.5 to 2.0 mol/kg. When the mixed amount is set to be in this range, the electrolyte membrane may further exhibit excellent ion conductivity regardless of temperature.

<Boron Compound (B)>

The boron compound (B) in the invention is not particularly limited, but preferred examples thereof include boron halides such as boron trifluoride; boron halide alkyl ether complexes such as a boron trifluoride dimethyl ether complex ($BF_3O(CH_3)_2$), a boron trifluoride diethyl ether complex ($BF_3O(C_2H_5)_2$), a boron trifluoride di-n-butyl ether complex ($BF_3O(C_4H_9)_2$), a boron trifluoride di-tert-butyl ether complex ($BF_3O((CH_3)_3C)_2$), a boron trifluoride tert-butyl methyl ether complex ($BF_3O((CH_3)_3C)(CH_3)$), and a boron trifluoride tetrahydrofuran complex ($BF_3OC_4H_8$); boron halide alcohol complexes such as a boron trifluoride methanol complex ($BF_3HOCH_3$), a boron trifluoride ethanol complex ($BF_3HOC_2H_5$), a boron trifluoride propanol complex ($BF_3HOC_3H_7$), and a boron trifluoride phenol complex ($BF_3HOC_6H_5$); boron halide amine complexes such as a boron trifluoride piperidinium complex and a boron trifluoride ethyl amine complex; 2,4,6-trialkoxy boroxine such as 2,4,6-trimethoxy boroxine; trialkyl borates such as trimethyl borate, triethyl borate, tri-n-propyl borate, tri-n-butyl borate, tri-n-pentyl borate, tri-n-hexyl borate, tri-n-heptyl borate, tri-n-octyl borate, triisopropyl borate, and trioctadecyl borate; triaryl borate such as triphenyl borate; and tris(trialkysilyl)borate such as tris(trimethyl silyl). More preferable examples of the boron compound (B) include boron halide and a boron halide complex. Still more preferable examples of the boron compound (B) include one or more kinds selected from the group consisting of boron halide, boron halide alkyl ether complex, and a boron halide alcohol complex. The reason why the boron compound is preferably one or more kinds selected from the group consisting of the above-described materials is that the boron compound serves as Lewis acid due to the strong electron attracting properties of a halogen atom, and thus may further disperse or dissolve the organic acid lithium salt (A). In addition, boron trifluoride or boron trifluoride complex is particularly preferable. Specifically, examples of the boron trifluoride complex include the boron halide alkyl ether complexes such as $BF_3O(CH_3)_2$, $BF_3O(C_2H_5)_2$, $BF_3O(C_4H_9)_2$, $BF_3O((CH_3)_3C)_2$, $BF_3O((CH_3)_3C)(CH_3)$, and $BF_3OC_4H_8$; and the boron halide alcohol complexes such as $BF_3HOCH_3$, $BF_3HOC_2H_7$, and $BF_3HOC_6H_5$.

It is assumed that the boron compound (B) has a function of promoting dissociation of lithium ions from anionic sites in the organic acid lithium salt (A) in an electrolytic solution to be described later, and of improving solubility of the organic acid lithium salt (A) in an organic solvent.

The boron compound (B) may be used alone or in combination of two or more kinds. In a case where two or more kinds are used in combination, the combination and ratio thereof may be appropriately selected according to a purpose.

When the organic acid lithium salt (A) and the boron compound (B) are used in combination, it is possible to provide an electrolyte that has substantially the same ion conductivity as an electrolyte using a lithium salt in the related art, and is excellent in lithium ion transference number, and an electrolyte membrane using the electrolyte.

In addition, in the invention, the "transport number of lithium ions" represents a "ratio of ion conductivity by lithium ions to the total ion conductivity", and for example, in an electrolyte membrane of a lithium ion secondary battery, it is preferable that the lithium ion transference number be close to 1.

The number of moles of lithium atoms in the organic acid lithium salt (A) and the number of moles of the boron compound (B) are not particularly limited, and are appropriately adjusted according to a kind of organic acid lithium salt (A) and boron compound (B) used. However, it is preferable that the ratio of the number of moles of lithium atoms in the organic acid lithium salt (A) to the number of moles of the boron compound (B) may be from 100:10 to 100:300, more preferably 100:10 to 100:200, still more preferably 100:30 to 100:150 (molar ratio), still more preferably 100:50 to 100:150 (molar ratio), still more preferably 100:80 to 100:105 (molar ratio), and still more preferably 100:70 to 100:105 (molar ratio).

When the number of moles of lithium atoms in the organic acid lithium salt (A): the number of moles of the boron compound (B) is set to the range, solubility of the organic acid lithium salt (A) in various organic solvents further increases. In addition, the electrolyte membrane may exhibit further excellent ion conductivity regardless of a temperature.

(Other Components)

In addition to the organic acid lithium salt (A) and the boron compound (B), other components may be mixed in the electrolyte of the invention in a range which does not deteriorate the effects of the invention.

(Method for Manufacturing Electrolyte)

The electrolyte of the invention may be manufactured by appropriately mixing the organic acid lithium salt (A), the boron compound (B), and other components as necessary.

Conditions such as an addition order, a temperature, and time during mixing of the respective components may be arbitrarily adjusted according to the kind of mixing components used.

<Electrolytic Solution>

In the electrolytic solution of the invention, a nonaqueous solvent (C), preferably, an organic solvent is mixed to the electrolyte of the invention. The electrolytic solution has satisfactory electrolyte solubility, and thus precipitation thereof is suppressed over a long period of time, and thus the electrolytic solution becomes very suitable for application to a lithium ion secondary battery, which has been considered to be impossible in the related art.

(Organic Solvent (C))

The organic solvent (C) is not particularly limited, and specifically, preferred examples thereof include carbonic acid ester compound such as ethylene carbonate, propylene carbonate, butylene carbonate, dimethyl carbonate, methylethyl carbonate, diethyl carbonate, vinylene carbonate, fluoroethylene carbonate, and 1,2-difluoroethylene carbonate; lactone compounds such as γ-butyrolactone and γ-valerolactone; carboxylic acid ester compounds such as methyl formate, ethyl formate, propyl formate, methyl acetate, ethyl acetate, propyl acetate, methyl propionate, ethyl propionate, and methyl butyrate; ether compounds such as tetrahydrofuran, 2-methyl tetrahydrofuran, 1,3-dioxolane, 4-methyl-1,3-dioxolane, dimethoxy ethane, diethylene glycol dimethyl ether, tetraethylene glycol dimethyl ether, and polyethylene glycol dimethyl ether; nitrile compounds such as acetonitrile, glutaronitrile, adiponitrile, methoxy acetonitrile, and 3-methoxy propionitrile; amid compounds such as N,N-dimethyl formamide and N,N-dimethyl acetamide; and sulfone compounds such as sulfolane and dimethyl sulfoxide.

The organic solvent (C) may be used alone or in combination of two or more kinds. In a case where two or more kinds are used in combination, the combination and ratio thereof may be appropriately selected according to a purpose.

As the organic solvent, lactones such as γ-butyrolactone and γ-valerolactone, and/or cyclic carbonates that have a branched chain such as propylene carbonate and butylene carbonate are preferable. When the organic solvent is used, an increase in viscosity at a low temperature, or precipitation of lithium salts may be prevented. Accordingly, the electrolytic solution may be used in a wide temperature range. In addition, when the organic solvent is used, the organic acid lithium salt or other lithium salts sufficiently ionize. Accordingly, a lithium ion secondary battery, which uses the electrolytic solution according to the invention, or a gel electrolyte to be described later, has excellent battery characteristics.

As the carbonic acid ester having a branched chain, compounds represented by the following general formula (I) are exemplary examples.

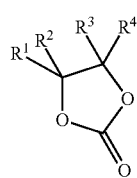

(I)

In the general formula (I), $R^1$, $R^2$, $R^3$, and $R^4$ independently represent an hydrogen atom, straight-chain or branched-chain alkyl group having a carbon number of 1 to 10, or a cycloalkyl group having a carbon number of 1 to 10. Among $R^1$, $R^2$, $R^3$, and $R^4$, one or more represent the alkyl group or the cycloalkyl group other than a hydrogen atom. Terminals of alkyl groups may be coupled to each other to form a ring.

For example, in a case where $R^1$ is an ethyl group, and $R^2$, $R^3$, and $R^4$ are hydrogen atoms, the branched-chain carbonate is 1,2-butylene carbonate. In addition, for example, in a case where $R^1$ and $R^4$ are methyl groups, and $R^2$ and $R^3$ are hydrogen atoms, the branched-chain carbonate is 2,3-butylene carbonate.

The organic solvent (C) is appropriately selected from the above-described materials in consideration of a valance of an oxidation-reduction potential, a dielectric constant, and viscosity.

A mixed amount of the organic solvent (C) is not particularly limited, and may be appropriately adjusted according to, for example, a kind of electrolytes. Commonly, it is preferable to adjust the mixed amount of the organic solvent so that the concentration of lithium atoms (Li) in the mixed organic acid lithium salt (A) [the number of moles (mol) of lithium atoms in the organic acid lithium salt (A)/the total mixed amount (kg) of (the organic acid lithium salt (A)+the boron compound (B)+the solvent (C))] becomes 0.2 to 3.0 mol/kg, and more preferably 0.4 to 2.0 mol/kg. When the concentration of the lithium atoms in the organic acid lithium salt is set to be equal to or more than the lower limit by adjusting the mixed amount of the organic solvent, the cycle characteristics during charging and discharging are improved, and particularly, satisfactory cycle characteristics are shown at a high rate. In addition, when the concentration of the lithium atoms in the organic acid lithium salt is set to be equal to or less than the upper limit, the organic acid lithium is sufficiently dissolved in the organic solvent.

(Other Components)

In addition to the electrolyte and the organic solvent, other components may be mixed in the electrolytic solution of the invention in a range which does not deteriorate the effects of the invention.

(Method for Manufacturing Electrolytic Solution)

The electrolytic solution of the invention may be manufactured by appropriately mixing the electrolyte, the organic solvent, and other components as necessary. Conditions such as an addition order, a temperature, and time during mixing of the respective components may be arbitrarily adjusted according to the kind of mixing components used.

<Gel Electrolyte>

In the gel electrolyte of the invention, a matrix polymer (D) is further mixed to the electrolytic solution of the invention. The electrolytic solution is held in the matrix polymer (D). The matrix polymer (D) may have a cross-linked gel structure. The gel electrolyte of the invention may be used instead of the electrolytic solution in a lithium ion secondary battery or in combination with the electrolytic solution. The gel electrolyte of the invention is gel-like, and thus the gel electrolyte is hardly leaked from the lithium ion secondary battery. Accordingly, safety is ensured.

(Matrix Polymer (D))

The matrix polymer (D) is not particularly limited, and a matrix polymer known in a solid electrolyte field may be appropriately used.

Specifically, preferred examples of the matrix polymer (D) include polyether-based polymers such as polyethylene oxide and polypropylene oxide; fluorine-based polymer such as polyvinyl fluoride, polyvinylidene fluoride, a polyvinylidene fluoride-propylene hexafluoride copolymer, a polyvinylidene fluoride-acetone hexafluoride copolymer, and polytetrafluoroethylene; polyacrylic polymers such as methyl poly(meta)acrylate, ethyl poly(meta)acrylate, polyacrylamide, and polyacrylate including an ethylene oxide unit; polyacrylonitrile; and polyphosphazene; and polysiloxane.

The matrix polymer (D) may be used alone or in combination of two or more kinds. In a case where two or more kinds are used in combination, the combination and ratio thereof may be appropriately selected according to a purpose.

The matrix polymer (D) is appropriately selected from the above-described materials in consideration of a valance of an oxidation-reduction potential, a dielectric constant, and viscosity.

The mixed amount of the matrix polymer (D) is not particularly limited, and may be appropriately adjusted according to a kind thereof. However, the mixed amount of the matrix polymer (D) in the total amount of mixing components of the gel electrolyte is commonly 1 to 98% by mass, and preferably 2 to 98% by mass, more preferably 1 to 50% by mass, and still more preferably 2 to 50% by mass. When the mixed amount is set to be equal to or more than the lower limit, strength of the gel electrolyte is further improved, and when the mixed amount is set to be equal to or less than the upper limit, a lithium ion secondary battery exhibits further excellent battery performance. As the lower limit, 20% by mass or more is more preferable. In addition, as the upper limit, 50% by mass or less is more preferable.

(Other Components)

In addition to the electrolyte of the invention, the organic solvent, and the matrix polymer, other components may be contained in the gel electrolyte in the invention in a range which does not deteriorate the effects of the invention.

The organic solvent that is used in the invention also functions as a plasticizer according to the amount used and the ratio thereof. As the plasticizer, the same materials exemplified as the organic solvent are exemplary examples.

The plasticizer remains in an electrolyte membrane to be described later, and a plasticizer known in the solid electrolyte field may be appropriately used, but a plasticizer capable of dissolving the matrix polymer (D), or a plasticizer capable of dissolving or dispersing the organic acid lithium salt (A) is preferable.

For example, the plasticizer may be selected according to whether or not an organic solvent for dilution is used during manufacturing of the electrolyte membrane. As described later, the organic solvent for dilution dilutes the electrolyte during manufacturing of the electrolyte membrane so as to make handling and shaping easy, and may be removed from the electrolyte membrane by final drying.

In a case where the organic solvent for dilution is not used, the above-described material may be used as the plasticizer without particular limitation.

On the other hand, in a case where the organic solvent for dilution is used and is dried, among the above-described materials, a material having a boiling point higher than the drying temperature, preferably, by 120° C. or higher, and more preferably by 150° C. or higher may be exemplary examples of the plasticizer.

Specifically, preferred examples of a plasticizer include cyclic carbonic acid esters such as ethylene carbonate, propylene carbonate, and butylene carbonate; lactones such as γ-butyrolactone and γ-valerolactone; chain carbonic acid esters such as dimethyl carbonate, methylethyl carbonate, and diethyl carbonate; ethers such as tetrahydrofuran, 1,2-dimethoxyethane, 2-methyl tetrahydrofuran, 1,3-dioxolane, and 4-methyl-1,3-dioxolane; carboxylic acid esters such as methyl formate, ethyl formate, n-propyl formate, methyl acetate, ethyl acetate, n-propyl acetate, methyl propionate, ethyl propionate, and methyl butyrate; nitriles such as acetonitrile, glutaronitrile, adiponitrile, methoxy acetonitrile, and 3-methoxy propionitrile; amides such as N,N-dimethyl formamide and N,N-dimethylacetamide; sulfones such as sulfolane and dimethyl sulfoxide; and oligoethylene oxides such as diethylene glycol dimethyl ether, tetraethylene glycol dimethyl ether, and polyethylene glycol dimethyl ether.

The plasticizer may be used alone or in combination of two or more kinds. In a case where two or more kinds are used in combination, the combination and ratio thereof may be appropriately selected according to a purpose.

A mixed amount of the plasticizer is not particularly limited, and may be appropriately adjusted according to a kind thereof as long as the strength of the electrolyte membrane does not significantly deteriorate. For example, it is preferable that the adjustment be made so that a ratio of the plasticizer to the total amount of mixing components is 3 to 50% by mass, and more preferably 5 to 40% by mass. When the ratio is set to be equal to or more than the lower limit, an effect of using the plasticizer may be sufficiently obtained.

[Method for Manufacturing Electrolyte]

The electrolyte of the invention may be manufactured by mixing the organic acid lithium salt (A), the boron compound (B), and as necessary, the organic solvent (C), the matrix polymer (D), the plasticizer (the organic solvent (C) may also serve as the plasticizer), and the other components.

During mixing of the respective components, it is preferable that the components be added and sufficiently mixed by various kinds of means. In addition, in a case of subsequently manufacturing the electrolyte membrane of the invention, the organic solvent for dilution may be further added as necessary, and the resultant composition that is obtained may be collectively mixed.

The respective components may be mixed while sequentially adding these components, or may be mixed after addition of the entire components as long as the mixing components can be uniformly dissolved or dispersed.

The mixing method of the respective components is not particularly limited, and for example, methods known in the related art, which use a stirring bar, a stirring blade, a ball mill, a stirrer, an ultrasonic disperser, an ultrasonic homogenizer, a rotation and revolution mixer, and the like, may be applied. Mixing conditions may be appropriately set according to various methods, and may be mixed for a predetermined time at room temperature or under a heating condition. However, examples of the method include a method of performing the mixing at 15° C. to 80° C. for 1 to 48 hours. During the mixing, it is preferable to sufficiently dissolve or disperse the organic acid lithium salt (A), and it is preferable to completely dissolve the matrix polymer (D).

In an electrolyte membrane, which is obtained from a solid electrolyte using a lithium salt such as lithium hexafluorophosphate ($LiPF_6$), lithium boron tetrafluoride ($LiBF_4$), and bis(trifluoromethyl sulfonyl) imide lithium ($LiN(SO_2CF_3)_2$) in the related art, even though ion conductivity is satisfactory, a lithium ion transference number is not sufficient. In addition, organic acid lithium salts such as lithium formate, lithium acetate, lithium propionate, lithium oxalate, lithium malonate, and lithium succinate are not likely to be remarkably dissolved alone in an organic solvent, and thus has not been applied as a lithium salt in a solid electrolyte until now. Conversely, in the electrolyte of the invention, particularly, the boron compound (B) is mixed, and thus even when the organic acid lithium salt (A) is used, both of the ion conductivity and the lithium ion transference number are excellent.

<Electrolyte Membrane and Method for Manufacturing the Same>

The electrolyte membrane of the invention is obtained using the electrolyte or the gel electrolyte of the invention.

For example, the electrolyte membrane of the invention may be manufactured by adding the organic solvent for dilution to the electrolyte of the invention, mixing the resultant mixture, flowing the composition that is obtained into a mold or a container, or casting the composition on a sheet, drying the composition to remove the organic solvent for dilution, and shaping into a desired shape. In addition, the electrolyte membrane may be molded as is using the electrolyte to which the plasticizer is mixed without adding the organic solvent for dilution.

The organic solvent for dilution may be any solvent as long as the solvent may be removed by drying, and an organic solvent having a boiling point of 120° C. or lower is preferable, and an organic solvent having a boiling point of 90° C. or lower is more preferable. In addition, for example, an organic solvent capable of sufficiently dissolving or dispersing any one of the mixing components is preferable, and an organic solvent capable of dissolving the matrix polymer (D), or an organic solvent capable of dissolving or dispersing the organic acid lithium salt (A) is more preferable. Specific examples of the organic solvent for dilution include a nitrile-based solvent such as acetonitrile; and an ether-based solvent such as tetrahydrofuran.

The organic solvent for dilution dilutes the electrolyte so as to make handling and shaping easy, and a used amount thereof may be appropriately adjusted according to a kind of electrolyte. In addition, it is preferable that the total amount of the organic solvent for dilution be removed during the drying, but a part of the organic solvent for dilution may remain in the electrolyte membrane within a range which does not deteriorate the effects of the invention as long as the organic solvent for dilution may serve as the plasticizer. In this case, the less the residual amount of the organic solvent for dilution is, more preferable. However, when assuming the remaining organic solvent for dilution as the plasticizer mixed during manufacturing of the electrolyte, adjustment is preferably performed so that the ratio of the sum of the residual amount of the organic solvent for dilution and the mixed amount of the organic solvent serving as the plasticizer to the total amount of the mixing components during manufacturing of the electrolyte and the residual amount of the organic solvent for dilution becomes 50% by mass or less, and more preferably 40% by mass or less.

A mixing method after the addition of the organic solvent for dilution is not particularly limited, and may be the same as the mixing method of the respective components during the manufacturing of the electrolyte.

As the mold or container, any mold or container capable of molding the electrolyte membrane into a desired shape may be used. For example, a mold or container formed from polytetrafluoroethylene is appropriate. In addition, as the sheet, any sheet, which does not absorbs the electrolyte, the composition obtained by adding the organic solvent for dilution to the electrolyte, and the like, may be used. For example, a polytetrafluoroethylene sheet, a polyethylene sheet, and the like are preferable.

A method of drying the electrolyte or the composition is not particularly limited, and for example, a method using a dry box, a vacuum desiccator, a vacuum dryer, and the like may be applied.

The electrolyte membrane of the invention shows the same ion conductivity as that of an electrolyte membrane using a lithium salt such as $LiPF_6$, $LiBF_4$, $LiN(SO_2CF_3)_2$ in the related art. Furthermore, for example, the electrolyte membrane of the invention shows an excellent lithium ion transference number as high as 0.5 or more at 40° C.

As described above, the electrolyte membrane of the invention shows approximately the same ion conductivity as that of the electrolyte membrane in the related art, and the lithium ion transference number is excellent. Accordingly, for example, when being applied to a lithium ion secondary battery, migration of a counter anion is suppressed during charging and discharging, and thus even when the charging and discharging is performed with a large current, concentration polarization of anions on an electrode is suppressed. As a result, a decrease in battery performance due to an increase in resistance is suppressed. In addition, the electrolyte membrane of the invention generally presents in a solid phase. Accordingly, a decrease in charging and discharging cycle lifetime characteristics and an internal short-circuit, which accompany volatilization and diffusion or leakage of the electrolytic solution, are suppressed, and thus high energy density may be realized. As a result, safety is high. Furthermore, reduction in thickness and lamination of the electrolyte membrane become easy, and thus improvement in processing properties and simplification of package may be realized.

The electrolyte membrane of the invention may be used similarly to the electrolyte membrane in the related art, and thus a lithium ion secondary battery excellent in characteristics may be manufactured. For example, the lithium ion secondary battery may be configured to include a negative electrode, a positive electrode, and an electrolyte membrane, and a separator may be provided between the negative electrode and the positive electrode as necessary.

<Method for Manufacturing Gel Electrolyte>

The gel electrolyte of the invention may be manufactured by appropriately mixing the electrolytic solution, the matrix polymer, and other components as necessary. Conditions such as an addition order, a temperature, and time during mixing of the respective components may be arbitrarily adjusted according to a kind of mixing components.

(Process of Forming Gel Electrolyte Layer)

In a process of forming the gel electrolyte layer in the method for manufacturing the gel electrolyte battery of the invention, first, the organic acid lithium salt (A), the boron compound (B), and the organic solvent (C) are mixed to prepare an electrolytic solution.

Conditions during mixing of the organic acid lithium salt (A), the boron compound (B), and the organic solvent (C) may be arbitrarily adjusted.

Subsequently, the matrix polymer (D) that is warmed in advance is mixed to the electrolytic solution to prepare a coating liquid containing the organic acid lithium salt (A), the boron compound (B), the organic solvent (C), and the matrix polymer (D).

It is preferable that a warming temperature of the matrix polymer (D) be 60° C. to 120° C., and more preferably 60° C. to 100° C.

When the warming temperature of the matrix polymer (D) is set to 60° C. or higher, flowability of the coating liquid may be secured. On the other hand, the warming temperature of the matrix polymer (D) is set to 120° C. or lower, vaporization of the organic solvent (C) is suppressed, and thus a coating liquid having a predetermined composition may be prepared.

Next, the coating liquid is applied to an object to be applied such as a substrate to form a gel electrolyte layer.

The coating liquid is also warmed during application of the coating liquid, but it is preferable that the warming temperature be 60° C. to 120° C., and more preferably 60° C. to 100° C.

When the warming temperature of the coating liquid is set to 60° C. or higher, flowability of the coating liquid may be secured. On the other hand, the warming temperature of the coating liquid is set to 120° C. or lower, vaporization of the organic solvent (C) is suppressed, and thus a coating liquid having a predetermined composition may be prepared.

It is preferable that time taken to warm the coating liquid within the above-described temperature range be 10 minutes or more, and more preferably 30 minutes or more.

When the time taken to warm the coating liquid within the above-described temperature range is set to 30 minutes or more, flowability of the coating liquid is secured, and thus the coating liquid may be uniformly mixed. On the other hand, although not particularly limited, the upper limit of the time needed to warm the coating liquid is set to approximately one day, vaporization of the organic solvent (C) is suppressed, and thus the composition of the coating liquid may be set to a predetermined composition.

Differently from an electrolyte and a gel electrolyte using general-purpose $LiPF_6$ in which deterioration proceeds due to heat in the related art, even when a warming treatment is performed over a long period of time, performance deterioration does not occur in the electrolyte and the gel electrolyte of the invention. Generally, the gel electrolyte is coated after being warmed to secure flowability, but $LiPF_6$ gradually deteriorates at approximately 60° C. Therefore, in a case where $LiPF_6$ is used as a lithium ion source, a method in which the gel electrolyte obtained by $LiPF_6$ is coated within several hours after being warmed is adopted, or another method, in which the electrolytic solution and the matrix polymer are mixed separately, only the matrix polymer is warmed and is mixed to the electrolytic solution immediately before the coating, and the gel electrolyte is coated, is adopted.

However, in the invention, the organic acid lithium is stabilized by heat.

Accordingly, when forming the gel electrolyte layer, even when all of the materials are collectively mixed, and the warming treatment is performed for a long period of time, the performance of the gel electrolyte does not vary. As a result, a manufacturing apparatus is simplified, and thus the manufacturing cost may be significantly suppressed.

<Lithium Ion Secondary Battery>

The lithium ion secondary battery of the invention is obtained using the above-described electrolytic solution, the electrolyte membrane, or the gel electrolyte of the invention.

The lithium ion secondary battery of the invention may have the same configuration as the lithium ion secondary battery in the related art except that the electrolytic solution, the electrolyte membrane, or the gel electrolyte of the invention is used. For example, the lithium ion secondary battery is configured to include the negative electrode, the positive electrode, and the electrolytic solution, the electrolyte membrane, or the gel electrolyte. Furthermore, a separator may be provided between the negative electrode and the positive electrode as necessary.

A material of the negative electrode is not particularly limited. However, examples thereof include metal lithium, a lithium alloy, a carbon-based material, a metal oxide, and the like that are capable of intercalating and deintercalating lithium, and it is preferable that the material of the negative electrode be one or more kinds selected from the group consisting of the above-described materials.

A material of the positive electrode is not particularly limited. However, examples thereof include transition metal oxides such as lithium cobaltate, lithium nickelate, lithium manganate, and olivine type lithium iron phosphate. It is preferable that the material of the positive electrode be one or more kinds selected from the group consisting of the above-described materials.

A material of the separator is not particularly limited. However, examples thereof include finely porous polymeric membrane, non-woven fabric, a glass fiber, and the like, and it is preferable that the material of the separator be one or more kinds selected from the group consisting of the above-described materials.

A shape of the lithium ion secondary battery of the invention is not particularly limited, and may be adjusted to various types such as a cylindrical type, a square type, a coin type, and a sheet type.

The lithium ion secondary battery of the invention may be manufactured according to a method known in the related art by using the electrolytic solution, the electrolyte membrane, the gel electrolyte, and the electrodes, for example, in a glove box or in a dried air atmosphere.

The lithium ion secondary battery of the invention uses an electrolyte in which the organic acid lithium salt (A) is mixed as the electrolytic solution, the electrolyte membrane, or the gel electrolyte, but precipitation of mixing components is suppressed over a long period of time, and thus the lithium ion secondary battery has sufficient charging and discharging characteristics.

EXAMPLES

Hereinafter, the invention will be described in more detail referring to specific examples. However, the invention is not limited to the following examples.

(1) Chemical Materials that are Used

Chemical materials used in the examples are shown below.

Raw Material of Organic Acid Lithium Salt (A)

Formic acid (manufactured by Sigma-Aldrich Co. LLC.)

Acetic acid (manufactured by Sigma-Aldrich Co. LLC.)

Propionic acid (manufactured by Sigma-Aldrich Co. LLC.)

Butyric acid (manufactured by Sigma-Aldrich Co. LLC.)

Isobutyric acid (manufactured by Sigma-Aldrich Co. LLC.)

Oxalic acid (manufactured by Wako Pure Chemical Industries, Ltd.)

Lithium oxalate (manufactured by Sigma-Aldrich Co. LLC.)

Succinic acid (manufactured by Sigma-Aldrich Co. LLC.)

Adipic acid (manufactured by Sigma-Aldrich Co. LLC.)

Lithium hydroxide monohydrate ($LiOH \cdot H_2O$) (manufactured by Sigma-Aldrich Co. LLC.)

Boron Compound (B)

Boron trifluoride diethyl ether complex ($BF_3O(C_2H_5)_2$) (manufactured by Sigma-Aldrich Co. LLC.)

Boron trifluoride di-n-butyl ether complex ($BF_3O(C_4H_9)_2$) (manufactured by Sigma-Aldrich Co. LLC.)

Boron trifluoride tetrahydrofuran complex ($BF_3OC_4H_8$) (manufactured by Sigma-Aldrich Co. LLC.)

Organic Solvent (C)

Ethylene carbonate (hereinafter, abbreviated as "EC") (manufactured by Kishida Chemical Co., Ltd.)

Dimethyl carbonate (hereinafter, abbreviated as "DMC") (manufactured by Kishida Chemical Co., Ltd.)

Propylene carbonate (hereinafter, abbreviated as "PC") (manufactured by Kishida Chemical Co., Ltd.)

γ-butyrolactone (hereinafter, abbreviated as "GBL") (manufactured by Kishida Chemical Co., Ltd.)

Ethyl methyl carbonate (hereinafter, abbreviated as "EMC") (manufactured by Kishida Chemical Co., Ltd.)

Plasticizer

Ethylene carbonate (hereinafter, abbreviated as "EC") (manufactured by Sigma-Aldrich Co. LLC.)

γ-butyrolactone (hereinafter, abbreviated as "GBL") (manufactured by Sigma-Aldrich Co. LLC.)

Matrix Polymer (D)

Polyvinylidene fluoride-propylene hexafluoride copolymer (hereinafter, abbreviated as "PVdF-HFP") (manufactured by Sigma-Aldrich Co. LLC.)

Polyethylene oxide (hereinafter, abbreviated as "PEO") (mass average molecular weight is 6,000.000, manufactured by Sigma-Aldrich Co. LLC.)

Others

Lithium hexafluorophosphate EC/DMC (3/7 (volume ratio)) solution (manufactured by Kishida Chemical Co., Ltd.)

Bis(trifluoromethyl sulfonyl) imide lithium (LiN($SO_2CF_3$)$_2$) (manufactured by Kishida Chemical Co., Ltd.)

Lithium boron tetrafluoride ($LiBF_4$) (manufactured by Kishida Chemical Co., Ltd.)

Organic Solvent for Dilution

Acetonitrile (dehydrated, manufactured by Sigma-Aldrich Co. LLC.)

(2) Preparation of Organic Acid Lithium Salt (A)

(2-1) Preparation of Lithium Formate

Formic acid (20.0 g, 434.5 mmol) was weighed and collected in a round-bottomed flask, and the formic acid was dissolved in 50 mL of distilled water. To the resultant solution, a solution obtained by dissolving LiOH.H$_2$O (17.87 g, 426.0 mmol) in 100 ml of distilled water was slowly added dropwise. The resultant solution was stirred for 24 hours at room temperature, and then was concentrated using a rotary evaporator. The concentrated solution was slowly added dropwise to 200 mL of acetonitrile, and a precipitated solid was washed again with acetonitrile and was dried, whereby a white powder of lithium formate was obtained.

(2-2) Preparation of Lithium Acetate

Acetic acid (10.0 g, 166.5 mmol) was weighed and collected in a round-bottomed flask, and the acetic acid was dissolved in 50 mL of distilled water. To the resultant solution, a solution obtained by dissolving LiOH.H$_2$O (7.15 g, 167.0 mmol) in 100 ml of distilled water was slowly added dropwise. The resultant solution was stirred for 24 hours at room temperature, and then was concentrated using a rotary evaporator. The concentrated solution was slowly added dropwise to 200 mL of acetonitrile, and a precipitated solid was washed again with acetonitrile and was dried, whereby a white powder of lithium acetate was obtained.

(2-3) Preparation of Lithium Propionate

Propionic acid (20.0 g, 270.0 mmol) was weighed and collected in a round-bottomed flask, and the propionic acid was dissolved in 50 mL of distilled water. To the resultant solution, a solution obtained by dissolving LiOH.H$_2$O (11.11 g, 264.7 mmol) in 100 ml of distilled water was slowly added dropwise. The resultant solution was stirred for 24 hours at room temperature, and then was concentrated using a rotary evaporator. The concentrated solution was slowly added dropwise to 200 mL of acetonitrile, and a precipitated solid was washed again with acetonitrile and was dried, whereby a white powder of lithium propionate was obtained.

(2-4) Preparation of Lithium Butyrate

Butyric acid (20.0 g, 227.0 mmol) was weighed and collected in a round-bottomed flask, and the butyric acid was dissolved in 50 mL of distilled water. To the resultant solution, a solution obtained by dissolving LiOH.H$_2$O (9.34 g, 222.5 mmol) in 100 ml of distilled water was slowly added dropwise. The resultant solution was stirred for 24 hours at room temperature, and then was concentrated using a rotary evaporator. The concentrated solution was slowly added dropwise to 200 mL of acetonitrile, and a precipitated solid was washed again with acetonitrile and was dried, whereby a white powder of lithium butyrate was obtained.

(2-5) Preparation of Lithium Isobutyrate

Isobutyric acid (20.0 g, 227.0 mmol) was weighed and collected in a round-bottomed flask, and the isobutyric acid was dissolved in 50 mL of distilled water. To the resultant solution, a solution obtained by dissolving LiOH.H$_2$O (9.34 g, 222.5 mmol) in 100 ml of distilled water was slowly added dropwise. The resultant solution was stirred for 24 hours at room temperature, and then was concentrated using a rotary evaporator. The concentrated solution was slowly added dropwise to 200 mL of acetonitrile, and a precipitated solid was washed again with acetonitrile and was dried, whereby a white powder of lithium isobutyrate was obtained.

(2-6) Preparation of Lithium Succinate

Succinic acid (10.0 g, 84.7 mmol) was weighed and collected in a round-bottomed flask, and the succinic acid was dissolved in 50 mL of distilled water. To the resultant solution, a solution obtained by dissolving LiOH.H$_2$O (7.27 g, 169.8 mmol) in 100 ml of distilled water was slowly added dropwise. The resultant solution was stirred for 24 hours at room temperature, and then was concentrated using a rotary evaporator. The concentrated solution was slowly added dropwise to 200 mL of acetonitrile, and a precipitated solid was washed again with acetonitrile, and was dried, whereby a white powder of lithium succinate was obtained.

(2-7) Preparation of Lithium Adipate

Adipic acid (20.0 g, 136.7 mmol) was weighed and collected in a round-bottomed flask, and the adipic acid was dissolved in 50 mL of distilled water. To the resultant solution, a solution obtained by dissolving LiOH.H$_2$O (11.26 g, 268.3 mmol) in 100 ml of distilled water was slowly added dropwise. The resultant solution was stirred for 24 hours at room temperature, and then was concentrated using a rotary evaporator. The concentrated solution was slowly added dropwise to 200 mL of acetonitrile, and a precipitated solid was washed again with acetonitrile, and was dried, whereby a white powder of lithium adipate was obtained.

(3) Manufacturing of Electrolyte, Electrolytic Solution, and Cell

Operations in the following examples and comparative examples were carried out in a dry box.

Example A1

<Manufacturing of Electrolyte and Electrolytic Solution>

Lithium acetate (0.182 g) obtained in (2-2), BF$_3$O(C$_2$H$_5$)$_2$ (0.392 g), and a mixed solvent of EC and DMC (EC:DMC=30:70 (volume ratio)) as an organic solvent were weighed and collected in a sample bottle, and were mixed so that the concentration of lithium atoms in lithium acetate became 1.0 mol/kg, whereby an electrolytic solution was obtained.

<Manufacturing of Coin-Type Cell>

A negative electrode (manufactured by Hohsen Corporation.) and a positive electrode (manufactured by Hohsen Corporation.) were punched into a disc shape having a diameter of 16 mm. In addition, a glass fiber as a separator was punched into a disc shape having a diameter of 17 mm.

The positive electrode, the separator, and the negative electrode that were laminated in this order in an SUS battery container (CR2032), and the electrolytic solution that was obtained as described above was impregnated into the separator, the negative electrode, and the positive electrode. Furthermore, an SUS plate (having a thickness of 1.2 mm and a diameter of 16 mm) was further mounted on the negative electrode, and the battery container was covered with a lid, whereby a coin-type cell was manufactured.

Example A2

<Manufacturing of Electrolyte and Electrolytic Solution>

Lithium succinate (0.377 g) obtained in (2-6), $BF_3O(C_2H_5)_2$ (0.863 g), and a mixed solvent of EC and DMC (EC:DMC=30:70 (volume ratio)) as an organic solvent were weighed and collected in a sample bottle, and were mixed so that a concentration of lithium atoms in lithium succinate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Comparative Example A1

<Manufacturing of Electrolytic Solution and Coin-Type Cell>

An electrolytic solution and a coin-type cell were manufactured by the same method as Example A1 except that $BF_3O(C_2H_5)_2$ was not used.

Comparative Example A2

<Manufacturing of Electrolytic Solution and Coin-Type Cell>

An electrolytic solution and a coin-type cell were obtained by the same method as Example A2 except that $BF_3O(C_2H_5)_2$ was not used.

Reference Example 1

[Manufacturing of Coin-Type Cell]

A coin-type cell was manufactured by the same method as Example A1 except that a lithium hexafluorophosphate EC/DMC (3/7 (volume ratio)) solution was used instead of the electrolytic solution obtained in Example A1.

Example A3

<Manufacturing of Electrolyte and Electrolytic Solution>

Lithium formate (0.111 g) obtained in (2-1), $BF_3O(C_2H_5)_2$ (0.303 g), and a mixed solvent of EC and DMC (EC:DMC=30:70 (volume ratio)) as an organic solvent were weighed and collected in a sample bottle, and were mixed so that the concentration of lithium atoms in lithium formate became 0.8 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A4

<Manufacturing of Electrolyte and Electrolytic Solution>

Lithium acetate (0.143 g) obtained in (2-2), $BF_3O(C_2H_5)_2$ (0.307 g), and a mixed solvent of EC and DMC (EC:DMC=30:70 (volume ratio)) as an organic solvent were weighed and collected in a sample bottle, and were mixed so that the concentration of lithium atoms in lithium acetate became 0.8 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A5

<Manufacturing of Electrolyte and Electrolytic Solution>

Lithium propionate (0.175 g) obtained in (2-3), $BF_3O(C_2H_5)_2$ (0.311 g), and a mixed solvent of EC and DMC (EC:DMC=30:70 (volume ratio)) as an organic solvent were weighed and collected in a sample bottle, and were mixed so that the concentration of lithium atoms in lithium propionate became 0.8 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A6

<Manufacturing of Electrolyte and Electrolytic Solution>

Lithium butyrate (0.209 g) obtained in (2-4), $BF_3O(C_2H_5)_2$ (0.315 g), and a mixed solvent of EC and DMC (EC:DMC=30:70 (volume ratio)) as an organic solvent were weighed and collected in a sample bottle, and were mixed so that the concentration of lithium atoms in lithium butyrate became 0.8 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A7

<Manufacturing of Electrolyte and Electrolytic Solution>

Lithium isobutyrate (0.209 g) obtained in (2-5), $BF_3O(C_2H_5)_2$ (0.315 g), and a mixed solvent of EC and DMC (EC:DMC=30:70 (volume ratio)) as an organic solvent were weighed and collected in a sample bottle, and were mixed so that a concentration of lithium atoms in lithium isobutyrate became 0.8 mol/kg, whereby an electrolytic solution was obtained.
<Manufacturing of Coin-Type Cell>
A coin-type cell was manufactured by the same method as Example A1 except that the electrolytic solution obtained in this example was used instead of the electrolytic solution obtained in Example A1.

Example A8

<Manufacturing of Electrolyte and Electrolytic Solution>
Lithium oxalate (0.102 g), $BF_3O(C_2H_5)_2$ (0.302 g), and a mixed solvent of EC and DMC (EC:DMC=30:70 (volume ratio)) as an organic solvent were weighed and collected in a sample bottle, and were mixed so that a concentration of lithium atoms in lithium oxalate became 0.8 mol/kg, whereby an electrolytic solution was obtained.
<Manufacturing of Coin-Type Cell>
A coin-type cell was manufactured by the same method as Example A1 except that the electrolytic solution obtained in this example was used instead of the electrolytic solution obtained in Example A1.

Example A9

<Manufacturing of Electrolyte and Electrolytic Solution>
Lithium succinate (0.133 g) obtained in (2-6), $BF_3O(C_2H_5)_2$ (0.305 g), and a mixed solvent of EC and DMC (EC:DMC=30:70 (volume ratio)) as an organic solvent were weighed and collected in a sample bottle, and were mixed so that the concentration of lithium atoms in lithium succinate became 0.8 mol/kg, whereby an electrolytic solution was obtained.
<Manufacturing of Coin-Type Cell>
A coin-type cell was manufactured by the same method as Example A1 except that the electrolytic solution obtained in this example was used instead of the electrolytic solution obtained in Example A1.

Example A10

<Manufacturing of Electrolyte and Electrolytic Solution>
Lithium adipate (0.166 g) obtained in (2-7), $BF_3O(C_2H_5)_2$ (0.310 g), and a mixed solvent of EC and DMC (EC:DMC=30:70 (volume ratio)) as an organic solvent were weighed and collected in a sample bottle, and were mixed so that the concentration of lithium atoms in lithium adipate became 0.8 mol/kg, whereby an electrolytic solution was obtained.
<Manufacturing of Coin-Type Cell>
A coin-type cell was manufactured by the same method as Example A1 except that the electrolytic solution obtained in this example was used instead of the electrolytic solution obtained in Example A1.

Example A11

<Manufacturing of Electrolyte and Electrolytic Solution>
Lithium acetate (0.143 g) obtained in (2-2), $BF_3O(C_2H_5)_2$ (0.245 g), and a mixed solvent of EC and DMC (EC:DMC=30:70 (volume ratio)) as an organic solvent were weighed and collected in a sample bottle, and were mixed so that the concentration of lithium atoms in lithium acetate became 0.8 mol/kg, whereby an electrolytic solution was obtained.

<Manufacturing of Coin-Type Cell>
A coin-type cell was manufactured by the same method as Example A1 except that the electrolytic solution obtained in this example was used instead of the electrolytic solution obtained in Example A1.

Example A12

<Manufacturing of Electrolyte and Electrolytic Solution>
Lithium acetate (0.143 g) obtained in (2-2), $BF_3O(C_2H_5)_2$ (0.276 g), and a mixed solvent of EC and DMC (EC:DMC=30:70 (volume ratio)) as an organic solvent were weighed and collected in a sample bottle, and were mixed so that the concentration of lithium atoms in lithium acetate became 0.8 mol/kg, whereby an electrolytic solution was obtained.
<Manufacturing of Coin-Type Cell>
A coin-type cell was manufactured by the same method as Example A1 except that the electrolytic solution obtained in this example was used instead of the electrolytic solution obtained in Example A1.

Example A13

<Manufacturing of Electrolyte and Electrolytic Solution>
Lithium acetate (0.143 g) obtained in (2-2), $BF_3O(C_2H_5)_2$ (0.291 g), and a mixed solvent of EC and DMC (EC:DMC=30:70 (volume ratio)) as an organic solvent were weighed and collected in a sample bottle, and were mixed so that the concentration of lithium atoms in lithium acetate became 0.8 mol/kg, whereby an electrolytic solution was obtained.
<Manufacturing of Coin-Type Cell>
A coin-type cell was manufactured by the same method as Example A1 except that the electrolytic solution obtained in this example was used instead of the electrolytic solution obtained in Example A1.

Example A14

<Manufacturing of Electrolyte and Electrolytic Solution>
Lithium acetate (0.143 g) obtained in (2-2), $BF_3O(C_2H_5)_2$ (0.337 g), and a mixed solvent of EC and DMC (EC:DMC=30:70 (volume ratio)) as an organic solvent were weighed and collected in a sample bottle, and were mixed so that the concentration of lithium atoms in lithium acetate became 0.8 mol/kg, whereby an electrolytic solution was obtained.
<Manufacturing of Coin-Type Cell>
A coin-type cell was manufactured by the same method as Example A1 except that the electrolytic solution obtained in this example was used instead of the electrolytic solution obtained in Example A1.

Reference Example A2

<Manufacturing of Electrolyte and Electrolytic Solution>
Lithium acetate (0.114 g) obtained in (2-2), $BF_3O(C_2H_5)_2$ (0.294 g), and a mixed solvent of EC and DMC (EC:DMC=30:70 (volume ratio)) as an organic solvent were weighed and collected in a sample bottle, and were mixed so that the concentration of lithium atoms in lithium acetate became 0.8 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A16

<Manufacturing of Electrolyte and Electrolytic Solution>

Lithium formate (1.11 g) obtained in (2-1), $BF_3O(C_2H_5)_2$ (3.03 g), and a mixed solvent of EC and DMC (EC:DMC=30:70 (volume ratio)) as an organic solvent were weighed and collected in a sample bottle, and were mixed so that the concentration of lithium atoms in lithium formate became 0.8 mol/kg, whereby an electrolytic solution was obtained. PVdF-HFP (6 parts by mass) was mixed to the electrolytic solution (94 parts by mass), and the resultant mixture was heated at 80° C., whereby a gel electrolyte was obtained.

<Manufacturing of Coin-Type Cell>

A negative electrode (manufactured by Hohsen Corporation.) and a positive electrode (manufactured by Hohsen Corporation.) were punched into a disc shape having a diameter of 16 mm. In addition, a glass fiber as a separator was punched into a disc shape having a diameter of 17 mm.

The positive electrode, the separator, and the negative electrode that were obtained were laminated in this order in an SUS battery container (CR2032). A liquefied material obtained by heating the gel electrolyte obtained as described above at 90° C. was impregnated into the separator, the negative electrode, and the positive electrode, and an SUS plate (having a thickness of 1.2 mm and a diameter of 16 mm) was further mounted on the negative electrode, and the battery container was covered with a lid, whereby a coin-type cell was manufactured.

Example A17

<Manufacturing of Electrolyte and Electrolytic Solution>

Lithium succinate (1.36 g) obtained in (2-6), $BF_3O(C_2H_5)_2$ (3.12 g), and a mixed solvent of EC and DMC (EC:DMC=30:70 (volume ratio)) as an organic solvent were weighed and collected in a sample bottle, and were mixed so that the concentration of lithium atoms in lithium succinate became 0.8 mol/kg, whereby an electrolytic solution was obtained. PVdF-HFP (8 parts by mass) was mixed to the electrolytic solution (92 parts by mass), and the resultant mixture was heated at 80° C., whereby a gel electrolyte was obtained.

<Manufacturing of Coin-Type Cell>

A coin-type cell was manufactured by the same method as Example A16 except that the gel electrolyte obtained in this example was used instead of the gel electrolyte obtained in Example A16.

Example A18

<Manufacturing of Electrolyte and Electrolytic Solution>

Lithium oxalate (0.157 g), $BF_3O(C_2H_5)_2$ (0.218 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A19

<Manufacturing of Electrolyte and Electrolytic Solution>

Lithium oxalate (0.165 g), $BF_3O(C_2H_5)_2$ (0.367 g), and a mixed solvent of EC and DMC (EC:DMC=30:70 (volume ratio)) as an organic solvent were weighed and collected in a sample bottle, and were mixed so that a concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A20

<Manufacturing of Electrolyte and Electrolytic Solution>

Lithium oxalate (0.168 g), $BF_3O(C_2H_5)_2$ (0.420 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A21

<Manufacturing of Electrolyte and Electrolytic Solution>

Lithium oxalate (0.169 g), $BF_3O(C_2H_5)_2$ (0.447 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A22

<Manufacturing of Electrolyte and Electrolytic Solution>

Lithium oxalate (0.171 g), $BF_3O(C_2H_5)_2$ (0.475 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A23

<Manufacturing of Electrolyte and Electrolytic Solution>

Lithium oxalate (0.172 g), $BF_3O(C_2H_5)_2$ (0.503 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A24

<Manufacturing of Electrolyte and Electrolytic Solution>

Lithium oxalate (0.174 g), $BF_3O(C_2H_5)_2$ (0.532 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A25

<Manufacturing of Electrolyte and Electrolytic Solution>

Lithium oxalate (0.177 g), $BF_3O(C_2H_5)_2$ (0.591 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A26

<Manufacturing of Electrolyte and Electrolytic Solution>

Lithium oxalate (0.187 g), $BF_3O(C_2H_5)_2$ (0.782 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Comparative Example A3

<Manufacturing of Electrolyte and Electrolytic Solution>

Lithium oxalate (0.242 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this comparative example was used instead of the electrolytic solution obtained in Example A1.

Example A27

<Manufacturing of Electrolyte and Electrolytic Solution>

Lithium oxalate (0.076 g), $BF_3O(C_2H_5)_2$ (0.212 g), and a mixed solvent of EC and DMC (EC:DMC=30:70 (volume ratio)) as an organic solvent were weighed and collected in a sample bottle, and were mixed so that the concentration of lithium atoms in lithium oxalate became 0.5 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A28

<Manufacturing of Electrolyte and Electrolytic Solution>

Lithium oxalate (0.130 g), $BF_3O(C_2H_5)_2$ (0.363 g), and a mixed solvent of EC and DMC (EC:DMC=30:70 (volume ratio)) as an organic solvent were weighed and collected in a sample bottle, and were mixed so that the concentration of lithium atoms in lithium oxalate became 0.8 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A29

<Manufacturing of Electrolyte and Electrolytic Solution>

Lithium oxalate (0.171 g), $BF_3O(C_2H_5)_2$ (0.475 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained.

<Manufacturing of Coin-Type Cell>

A coin-type cell was manufactured by the same method as Example A1 except that the electrolytic solution obtained in this example was used instead of the electrolytic solution obtained in Example A1.

Example A30

<Manufacturing of Electrolyte and Electrolytic Solution>

Lithium oxalate (0.215 g), $BF_3O(C_2H_5)_2$ (0.599 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.2 mol/kg, whereby an electrolytic solution was obtained.

<Manufacturing of Coin-Type Cell>
A coin-type cell was manufactured by the same method as Example A1 except that the electrolytic solution obtained in this example was used instead of the electrolytic solution obtained in Example A1.

Example A31

<Manufacturing of Electrolyte and Electrolytic Solution>
Lithium oxalate (0.290 g), $BF_3O(C_2H_5)_2$ (0.809 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.5 mol/kg, whereby an electrolytic solution was obtained.
<Manufacturing of Coin-Type Cell>
A coin-type cell was manufactured by the same method as Example A1 except that the electrolytic solution obtained in this example was used instead of the electrolytic solution obtained in Example A1.

Example A32

<Manufacturing of Electrolyte and Electrolytic Solution>
Lithium oxalate (0.448 g), $BF_3O(C_2H_5)_2$ (1.248 g), and a mixed solvent of EC and DMC (EC:DMC=30:70 (volume ratio)) as an organic solvent were weighed and collected in a sample bottle, and were mixed so that the concentration of lithium atoms in lithium oxalate became 2.0 mol/kg, whereby an electrolytic solution was obtained.
<Manufacturing of Coin-Type Cell>
A coin-type cell was manufactured by the same method as Example A1 except that the electrolytic solution obtained in this example was used instead of the electrolytic solution obtained in Example A1.

Comparative Example A4

<Manufacturing of Electrolyte and Electrolytic Solution>
$LiPF_6$ (0.807 g, 5.31 mmol), and a mixed solvent of EC and DMC (EC:DMC=30:70 (volume ratio)) as an organic solvent were weighed and collected in a sample bottle, and were mixed so that the concentration of lithium atoms in $LiPF_6$ became 1.0 mol/kg, whereby an electrolytic solution was obtained.
<Manufacturing of Coin-Type Cell>
A coin-type cell was manufactured by the same method as Example A1 except that the electrolytic solution obtained in this comparative example was used instead of the electrolytic solution obtained in Example A1.

Example A33

<Manufacturing of Electrolyte and Electrolytic Solution>
Lithium succinate (0.738 g) obtained in (2-6), $BF_3O(C_2H_5)_2$ (1.611 g), and a mixed solvent of EC and DMC (EC:DMC=30:70 (volume ratio)) as an organic solvent were weighed and collected in a sample bottle, and were mixed so that the concentration of lithium atoms in lithium succinate became 1.0 mol/kg, whereby an electrolytic solution was obtained.
<Manufacturing Laminate Battery>
A negative electrode (manufactured by Hohsen Corporation.) and a positive electrode (manufactured by Hohsen Corporation.) were cut into an approximately rectangular shape. A portion covered with an active material layer was set to 72×50 mm in the negative electrode and 68×46 mm in the positive electrode. The cutting was performed with a portion (tab portion), which was not covered with the active material layer, left in approximately 1×10 cm.
As a separator, celgard 2500 (manufactured by (Celgard, LLC., single layer PP) was cut into 84×62 mm.
The electrolytic solution that was obtained as described above was impregnated into the separator, the negative electrode, and the positive electrode, and then the negative electrode, the separator, and the positive electrode were laminated in this order. The laminated body was put into a member obtained by shaping an aluminum laminate film into a bag shape, and an end portion thereof was sealed. Furthermore, the inside of the laminate was evacuated using a vacuum packaging machine, whereby a laminated battery was manufactured. In addition, a design capacity of the laminate battery was 46.9 mAh.

Example A34

<Manufacturing of Electrolyte and Electrolytic Solution>
Lithium oxalate (0.568 g), $BF_3O(C_2H_5)_2$ (1.583 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained. PVdF-HFP (6 parts by mass) was mixed to the electrolytic solution (94 parts by mass), and the resultant mixture was heated at 80° C., whereby a gel electrolyte was obtained.

Example A35

Lithium oxalate (0.568 g), $BF_3O(C_2H_5)_2$ (1.583 g), and a mixed solvent of EC and DMC (EC:DMC=30:70 (volume ratio)) as an organic solvent were weighed and collected in a sample bottle, and were mixed so that the concentration of lithium atoms in lithium oxalate became 1.0 mol/kg, whereby an electrolytic solution was obtained. PEO (6 parts by mass) was mixed to the electrolytic solution (94 parts by mass), and the resultant mixture was heated at 80° C., whereby a gel electrolyte was obtained.
<Manufacturing of Laminate Battery>
A laminate battery was manufactured by the same method as Example A33 except that the gel electrolyte obtained in this example was used instead of the electrolytic solution obtained in Example A33.
Impregnation of the gel electrolyte obtained as described above was carried out by impregnating a liquefied material, which was obtained by heating the gel electrolyte obtained as described above at 90° C., into the separator, the negative electrode, and the positive electrode.

Comparative Example A5

<Manufacturing of Electrolytic Solution and Laminate Battery>
A laminate battery was manufactured by the same method as Example A33 except that $LiPF_6$ (EC:DMC=30:70 (volume ratio)) was used instead of the electrolytic solution obtained in Example A33.

(4) Evaluation of Solubility of Electrolytic Solution
Solubility of the electrolytic solutions of Examples A1 to A15, and Comparative Examples A1 and A2 was evaluated according to the following evaluation standards.
Results are shown in Tables A1 and A2. In addition, with regard to Reference Example A1, solubility of the electrolytic solution was evaluated with respect to lithium hexafluorophosphate, and the results thereof are shown in combination.

A: The organic acid lithium salt was completely dissolved in a solvent.

B: An undissolved portion of the organic acid lithium salt was present.

In addition, in the tables, "(B)/Li (molar ratio)" represents a molar ratio of "[a mixed amount (the number of moles) of boron compound (B)]/[the number of moles of lithium atoms in the mixed organic acid lithium salt (A)]."

(5) Evaluation-1 of Battery Performance of Coin-Type Cell

The coin-type cells of Examples A1 and A2, Comparative Examples A1 and A2, and Reference Example A1 were charged with a current value of 0.2 C at 25° C. to 4.2 V, and then were discharged with a current value of 0.2 C to 2.5 V. This charging and discharging cycle was repetitively carried out to obtain a ratio of the capacity of the coin-type cells of Examples A1 and A2, and Comparative Examples A1 and A2 to the capacity of the coil-type cell of Reference Example A1 at the $10^{th}$ cycle ([capacity (mAh) of the coin-type cells of Examples A1 and A2, and Comparative Examples A1 and A2 at the $10^{th}$ cycle]/[capacity (mAh) of the coin-type cell of Reference Example A1 at the $10^{th}$ cycle]). Results are shown in Table A1.

(6) Evaluation-2 of Battery Performance of Coin-Type Cell

With respect to the coin-type cells of Examples A3 to A17, and Reference Example 1, constant current and constant voltage charging of 0.2 C at 25° C. was carried out until a current value converged to 0.1 C with the upper limit voltage set to 4.2 V, and then constant current discharging of 0.2 C was carried out up to 2.7 V. Then, the charging and discharging current was set to 1 C, and a charging and discharging cycle was repetitively carried out by the same method to calculate a capacity retention rate after 100 cycles (discharging capacity (mAh) at the $105^{th}$ cycle/discharging capacity (mAh) at the $5^{th}$ cycle. Results are shown in Tables A2 and A3.

(7) Evaluation-3 of Battery Performance of Coin-Type Cell

With respect to the coin-type cells of Examples A18 to A26, and Comparative Example A3, constant current and constant voltage charging of 0.2 C at 25° C. was carried out until a current value converged to 0.1 C with the upper limit voltage set to 4.2 V, and then constant current discharging of 0.2 C was carried out up to 2.7 V. Then, the charging and discharging current was set to 1 C, and the charging and discharging cycle was repetitively carried out by the same method several times to several tens of times to stabilize a battery state. Then, the charging and discharging current was set to 1 C, and the charging and discharging cycle was repetitively carried out by the same method to calculate a capacity retention rate after 100 cycles (discharging capacity (mAh) at the $100^{th}$ cycle/discharging capacity (mAh) at the $1^{th}$ cycle. Results are shown in Table A4.

(8) Evaluation-4 of Battery Performance of Coin-Type Cell

With respect to the coin-type cells of Examples A27 to A32, and Comparative Example A4, constant current and constant voltage charging of 0.2 C at 25° C. was carried out until a current value converged to 0.1 C with the upper limit voltage set to 4.2 V, and then constant current discharging of 0.2 C was carried out up to 2.7 V. Then, the charging and discharging current was set to 1 C, and the charging and discharging cycle was repetitively carried out constant times by the same method. Then, the charging and discharging current was set to 5 C, and the charging and discharging cycle was repetitively carried out by the same method to calculate a capacity retention rate after 100 cycles (discharging capacity (mAh) with 5 C at the $100^{th}$ cycle/discharging capacity (mAh)) with 5 C at the $1^{th}$ cycle. Results are shown in Table A5.

(9) Evaluation of Laminate Battery Performance

With respect to the laminate batteries of Examples A33 to A34, and Comparative Example A5, constant current and constant voltage charging of 0.2 C at 25° C. was carried out until a current value converged to 0.1 C with the upper limit voltage set to 4.2 V, and then constant current discharging of 0.2 C was carried out up to 2.7 V. Then, the charging and discharging current was set to 1 C, and the charging and discharging cycle was repetitively carried out by the same method several times to several tens of times to stabilize a battery state. Next, after carrying out only charging, and the laminate batteries were left 7 days under an environment of 60° C. Then, the charging and discharging current was set to 1 C, and discharging→charging→discharging were repetitively carried out, and a ratio of discharging capacity at the $30^{th}$ time to discharging capacity at the $2^{nd}$ time (discharging capacity (mAh) at the $30^{th}$ time/discharging capacity (mAh) at the $2^{nd}$ time) was set to a capacity retention rate. Results are shown in Table A6.

TABLE A1

| | Li salt | (B)/Li (molar ratio) | Solubility | Ratio of capacity |
|---|---|---|---|---|
| Example A1 | Lithium acetate | 1.00 | A | 0.91 |
| Example A2 | Lithium succinate | 1.05 | A | 0.82 |
| Comparative Example A1 | Lithium acetate | 0 | B | (Charging and discharging are impossible) |
| Comparative Example A2 | Lithium succinate | 0 | B | (Charging and discharging are impossible) |

TABLE A2

| | Li salt | (B)/Li (molar ratio) | Solubility | Capacity retention rate |
|---|---|---|---|---|
| Example A3 | Lithium formate | 1.00 | A | 0.96 |
| Example A4 | Lithium acetate | 1.00 | A | 0.81 |
| Example A5 | Lithium propionate | 1.00 | A | 0.84 |
| Example A6 | Lithium butyrate | 1.00 | A | 0.82 |
| Example A7 | Lithium isobutyrate | 1.00 | A | 0.8 |
| Example A8 | Lithium oxalate | 1.06 | A | 0.99 |
| Example A9 | Lithium succinate | 1.05 | A | 0.91 |
| Example A10 | Lithium adipate | 1.04 | A | 0.77 |
| Example A11 | Lithium acetate | 0.80 | A | 0.74 |
| Example A12 | Lithium acetate | 0.90 | A | 0.75 |
| Example A13 | Lithium acetate | 0.95 | A | 0.78 |
| Example A14 | Lithium acetate | 1.10 | A | 0.82 |
| Reference Example A1 | LiPF$_6$ | 0 | A | 0.86 |
| Reference Example A2 | Lithium acetate | 1.20 | A | 0.66 |

TABLE A3

| | Li salt | (B)/Li (molar ratio) | Ratio of D (% by mass) | Capacity retention rate |
|---|---|---|---|---|
| Example A16 | Lithium formate | 1.00 | 6 | 0.97 |

TABLE A3-continued

| | Li salt | (B)/Li (molar ratio) | Ratio of D (% by mass) | Capacity retention rate |
|---|---|---|---|---|
| Example A17 | Lithium succinate | 1.05 | 8 | 0.86 |

TABLE A4

| | Li salt | (B)/Li (molar ratio) | Concentration of Li (mol/kg) | Capacity retention rate |
|---|---|---|---|---|
| Example A18 | Lithium oxalate | 0.50 | 1.0 | 0.91 |
| Example A19 | Lithium oxalate | 0.80 | 1.0 | 0.98 |
| Example A20 | Lithium oxalate | 0.90 | 1.0 | 0.97 |
| Example A21 | Lithium oxalate | 0.95 | 1.0 | 0.99 |
| Example A22 | Lithium oxalate | 1.0 | 1.0 | 0.99 |
| Example A23 | Lithium oxalate | 1.05 | 1.0 | 0.98 |
| Example A24 | Lithium oxalate | 1.10 | 1.0 | 0.89 |
| Example A25 | Lithium oxalate | 1.20 | 1.0 | 0.87 |
| Example A26 | Lithium oxalate | 1.50 | 1.0 | 0.90 |
| Comparative Example A3 | Lithium oxalate | 0 | 1.0 | (Charging and discharging are impossible) |

TABLE A5

| | Li salt | (B)/Li (molar ratio) | Concentration of Li (mol/kg) | Capacity retention rate at charging and discharging with 5 C |
|---|---|---|---|---|
| Example A27 | Lithium oxalate | 1.00 | 0.5 | 0.73 |
| Example A28 | Lithium oxalate | 1.00 | 0.8 | 0.77 |
| Example A29 | Lithium oxalate | 1.00 | 1.0 | 0.93 |
| Example A30 | Lithium oxalate | 1.00 | 1.2 | 0.89 |
| Example A31 | Lithium oxalate | 1.00 | 1.5 | 0.94 |
| Example A32 | Lithium oxalate | 1.00 | 2.0 | 0.88 |
| Comparative Example A4 | $LiPF_6$ | — | 1.0 | 0.36 |

TABLE A6

| | Li salt | Capacity retention rate |
|---|---|---|
| Example A33 | Lithium succinate | 0.99 |
| Example A34 | Lithium oxalate | 0.97 |
| Example A35 | Lithium oxalate | 0.87 |
| Comparative Example A5 | $LiPF_6$ | 0.67 |

As is clear from the results of Example A1 shown in Table 1, when being mixed in combination with $BF_3O(C_2H_2$, lithium acetate could be dissolved in the organic solvent, and sufficient charging and discharging characteristics were shown.

In addition, as is clear from the results of Example A2 shown in Table A1, even when organic acid lithium having a different structure was mixed, substantially the same results as Example A1 were obtained.

On the other hand, as is clear from the results of Comparative Example A1 shown in Table A1, in a case where $BF_3O(C_2H_5)_2$ was not mixed, the lithium acetate was hardly dissolved in the solvent, and an charging and discharging behavior was not shown.

In addition, as is clear from the results of Comparative Example A2 shown in Table A1, even when an organic acid lithium having a different structure was mixed, since $BF_3O(C_2H_5)_2$ was not mixed, the same results as Comparative Example A1 were obtained.

Furthermore, as is clear from the results of Examples A3 to A15 shown in Table A2, even when various kinds of organic acid lithium were mixed in various kinds of amounts, similarly to Examples A1 and A2, the various kinds of organic acid lithium could be dissolved in the organic solvent, and sufficient charging and discharging characteristics were shown.

In addition, as is clear from the results of Examples A16 and A17 shown in Table A3, in the gel electrolytes in which the organic acid lithium was mixed in combination with $BF_3O(C_2H_5)_2$, sufficient charging and discharging characteristics were shown.

In addition, as is clear from the results of Examples A18 to A26 shown in Table A4, even when a ratio of $BF_3O(C_2H_5)_2$ to the organic acid lithium salt was variously changed, charging and discharging could be carried out. Particularly, in a case where a mixed amount of lithium atoms in the organic acid lithium salt (A) in terms of the number of moles:a mixed amount of the boron compound (B) in terms of the number of moles was 100:50 to 100:150 (molar ratio), the capacity retention rate at rapid charging was superior to a lithium ion secondary battery using a lithium salt such as $LiPF_6$ in the related art.

As is clear from the results of Examples A27 to A32, and Comparative Example 4 shown in Table A5, even when the concentration of the organic acid lithium was variously changed, charging and discharging could be carried out. Particularly, in a case where the concentration of lithium atoms in the organic acid lithium salt was 0.5 to 2.0 mol/kg, the capacity retention rate at rapid charging was superior to a lithium ion secondary battery using a lithium salt such as $LiPF_6$ in the related art.

As is clear from the results of Examples A33 and A34 shown in Table 6, a battery in which the organic acid lithium salt was combined with $BF_3O(C_2H_5)_2$, even when being heated at a high temperature, the capacity retention rate was excellent in the subsequent charging and discharging.

On the other hand, as is clear from the results of Comparative Example A5 shown in Table A6, in a battery using $LiPF_6$, the capacity retention rate in charging and discharging after being heated decreased.

(3) Manufacturing of Gel Electrolyte and Cell

Operations in the following examples and comparative examples were carried out in a dry box.

Example B1

<Manufacturing of Gel Electrolyte>

Lithium oxalate (0.284 g), $BF_3O(C_2H_5)_2$ (0.792 g), and a mixed solvent of EC and DMC (EC:DMC=30:70 (volume ratio)) as an organic solvent were weighed and collected in a sample bottle, and were mixed so that the concentration of lithium atoms became 1.0 mol/kg, whereby an electrolytic solution was obtained. PVdF-HFP (6 parts by mass) was mixed to the electrolytic solution (94 parts by mass) heated at 80° C., whereby a gel electrolyte was obtained.

<Manufacturing of Coin-Type Cell>

A negative electrode (manufactured by Hohsen Corporation.) and a positive electrode (manufactured by Hohsen Corporation.) were punched into a disc shape having a diameter of 16 mm. In addition, a glass fiber as a separator was punched into a disc shape having a diameter of 17 mm.

The positive electrode, the separator, and the negative electrode that were obtained were laminated in this order in an SUS battery container (CR2032). Next, a material, which was obtained by warming the gel electrolyte obtained as described above at 80° C. for 24 hours, was impregnated into the separator, the negative electrode, and the positive electrode, and an SUS plate (having a thickness of 1.2 mm and a diameter of 16 mm) was further mounted on the negative electrode, and the battery container was covered with a lid, whereby a coin-type cell was manufactured. In addition, a design capacity of the coin-type cell was 3 mAh.

Comparative Example B1

<Adjustment of Gel Electrolyte>

A gel electrolyte was obtained by the same method as Example B1 except that a lithium hexafluorophosphate EC/DMC (3/7 (volume ratio)) solution (lithium oxalate and $BF_3O(C_2H_5)_2$ were not used) was used instead of the electrolytic solution prepared in Example B1.

<Manufacturing of Coin-Type Cell>

A coin-type cell was manufactured by the same method as Example B1 by using the gel electrolyte obtained in Comparative Example B1 instead of the gel electrolyte obtained in Example B1.

Comparative Example B2

A coin-type cell was manufactured by the same method as Example B1 except that a material, which was obtained by warming the gel electrolyte obtained in Comparative Example B1 at 80° C. for 4 hours, was used.

Comparative Example B3

A coin-type cell was manufactured by the same method as Example B1 except that a material, which was obtained by warming the gel electrolyte obtained in Comparative Example B1 at 60° C. for 24 hours, was used.

Reference Example B1

A coin-type cell was manufactured by the same method as Example B1 by using the electrolytic solution of lithium oxalate prepared in Example B1 as is without performing the warming.

Reference Example B2

A coin-type cell was manufactured by the same method as Example B1 by using the electrolytic solution of lithium hexafluorophosphate used in Comparative Example B1 as is without performing the warming.

[Evaluation of Battery Performance]

With respect to the coin-type cells of Example B1, Comparative Examples B1 and B2, and Reference Example B1 and B2, constant current and constant voltage charging of 0.2 C at 25° C. was carried out until a current value converged to 0.1 C with the upper limit voltage set to 4.2 V, and then constant current discharging of 0.2 C was carried out up to 2.7 V. Then, the charging and discharging current was set to 1 C, and the charging and discharging cycle was repetitively carried out by the same method several times to several tens of times to stabilize a battery state. Then, the charging and discharging current was set to 1 C, and the charging and discharging cycle was repetitively carried out by the same method. As a capacity occurrence rate, the discharging capacity at the $1^{st}$ cycle after the stabilization to the design capacity (discharging capacity (mAh) at the $1^{st}$ cycle/design capacity (3 mAh)) was calculated, and as a capacity retention rate, the discharging capacity at the $100^{th}$ cycle to the discharging capacity at the $1^{st}$ cycle after the stabilization (discharging capacity (mAh) at the $100^{th}$ cycle/discharging capacity (mAh) at the $1^{st}$ cycle) was calculated. The results are shown in Table B1.

TABLE B1

| | | Warming time | | Capacity occurrence | Capacity retention |
|---|---|---|---|---|---|
| | Li salt | 60° C. | 80° C. | rate | rate |
| Example B1 | Lithium oxalate | — | 24 hours | 0.94 | 0.99 |
| Reference Example B1 | Lithium oxalate | — | — | 0.99 | 0.99 |
| Reference Example B2 | $LiPF_6$ | — | — | 1.04 | 0.95 |
| Comparative Example B1 | $LiPF_6$ | — | 24 hours | 0.61 | 0.84 |
| Comparative Example B2 | $LiPF_6$ | — | 4 hours | 1.08 | 0.92 |
| Comparative Example B3 | $LiPF_6$ | 24 hours | — | 0.99 | 0.91 |

In the coin-type cell using the gel electrolyte of the invention, from the results of Example B1, it could be understood that even when the warming was carried out at 80° C. for 24 hours, a capacity approximately close to the design capacity occurred, and the capacity retention rate varied very little.

On the other hand, in the coin-type cell using lithium hexafluorophosphate, from the results of Comparative Examples B1 and B2, it could be understood that when being warmed at 80° C., the capacity greatly decreased in 24 hours, and the capacity retention rate decreased even in 4 hours. In addition, it could be understood that even when being warmed at 60° C. for 24 hours, the capacity retention rate decreased.

(4) Preparation of Organic Acid Lithium Salt (A)

(4-1) Preparation of Lithium Formate

A white powder of lithium formate was obtained by the same method as (2-1).

(4-2) Preparation of Lithium Acetate

A white powder of lithium acetate was obtained by the same method as (2-2).

(4-3) Preparation of Lithium Oxalate

Oxalic acid (10.0 g, 111 mmol) was weighed and collected in a round-bottomed flask, the oxalic acid was dissolved in 100 mL of distilled water. To the resultant solution, a solution obtained by dissolving $LiOH.H_2O$ (9.23 g, 220 mmol) in 100 ml of distilled water was slowly added dropwise. The resultant solution was stirred at room temperature for 24 hours, and then was concentrated using a rotary evaporator. The concentrated solution was slowly added dropwise to 200 mL of acetonitrile, and a precipitated solid was washed again with acetonitrile and was dried, whereby a white powder of lithium oxalate was obtained.

(4-4) Preparation of Lithium Succinate

A white powder of lithium succinate was obtained by the same method as (2-6).

(5) Preparation of Electrolyte and Electrolyte Membrane

Manufacturing of the electrolyte membrane in the following examples and comparative examples were carried out in a dry boxy or a vacuum desiccator.

Example C1

PEO (0.50 g), Lithium formate (0.059 g) obtained in (4-1), and $BF_3O(C_2H_5)_2$ (0.161 g) were weighed and collected in a sample bottle, acetonitrile (12 mL) was added to the resultant mixture, and the resultant solution was stirred at room temperature for 24 hours. After confirming that PEO was completely dissolved in acetonitrile, and lithium formate was sufficiently dissolved in the solution, an electrolytic solution that was obtained was casted in polytetrafluoroethylene schale (having a diameter of 7.5 cm). Next, the schale was transferred to a vacuum desiccator, and acetonitrile was removed by drying the electrolytic solution at 20° C. for 24 hours while flowing dry nitrogen at a flow rate of 2 L/minute to the schale, whereby an electrolyte membrane was obtained. Mixing ratios of the organic acid lithium salt (A) and respective components during manufacturing of the electrolyte are shown in Table C1. In addition, in Table C1, "boron compound (B)/lithium atoms (A) (molar ratio)" represents "a molar ratio of [a mixed amount (the number of moles) of the boron compound (B)]/[the number of moles lithium atoms in the mixed organic acid lithium salt (A)]. In addition, "the total mixing components:plasticizer (mass ratio)" represents "the total amount of mixing components:a mixed amount of the plasticizer (mass ratio)", and "the organic solvent for dilution" was not contained in the "mixing components".

Example C2

An electrolyte membrane was obtained by the same method as Example C1 except that lithium acetate (0.075 g) obtained in (4-2) was used instead of lithium formate (0.059 g).

Example C3

An electrolyte membrane was obtained by the same method as Example C1 except that lithium oxalate (0.055 g) obtained in (4-3) was used instead of lithium formate (0.059 g).

Example C4

An electrolyte membrane was obtained by the same method as Example C1 except that lithium succinate (0.070 g) obtained in (4-4) was used instead of lithium formate (0.059 g).

Example C5

PEO (0.50 g), Lithium formate (0.049 g) obtained in (4-1), $BF_3O(C_2H_5)_2$ (0.134 g), and a mixed solvent of EC and GBL (EC:GBL=30:70 (volume ratio)) (0.246 g) were weighed and collected in a sample bottle, acetonitrile (12 mL) was added to the resultant solution, and the solution was stirred at room temperature for 24 hours. After confirming that PEO was completely dissolved in acetonitrile, and lithium formate was sufficiently dissolved in the solution, an electrolytic solution that was obtained was casted in a polytetrafluoroethylene schale (having a diameter of 7.5 cm). Next, the schale was transferred to a vacuum desiccator, and acetonitrile was removed by drying the electrolytic solution at 20° C. for 24 hours while flowing dry nitrogen at a flow rate of 2 L/minute to the schale, whereby an electrolyte membrane was obtained.

Example C6

An electrolyte membrane was obtained by the same method as Example C5 except that lithium acetate (0.062 g) obtained in (4-2) was used instead of lithium formate (0.049 g).

Example C7

An electrolyte membrane was obtained by the same method as Example C5 except that lithium oxalate (0.045 g) obtained in (4-3) was used instead of lithium formate (0.049 g).

Example C8

An electrolyte membrane was obtained by the same method as Example C5 except that lithium succinate (0.059 g) obtained in (4-4) was used instead of lithium formate (0.049 g).

Comparative Example C1

An electrolyte membrane was obtained by the same method as Example C1 except that $BF_3O(C_2H_5)_2$ was not mixed.

Comparative Example C2

An electrolyte membrane was obtained by the same method as Example C3 except that $BF_3O(C_2H_5)_2$ was not mixed.

Comparative Example C3

An electrolyte membrane was obtained by the same method as Example C5 except that $BF_3O(C_2H_5)_2$ was not mixed.

Comparative Example C4

An electrolyte membrane was obtained by the same method as Example C7 except that $BF_3O(C_2H_5)_2$ was not mixed.

Reference Example C1

PEO (0.50 g) and $LiN(SO_2CF_3)_2$ (0.326 g) were weighed and collected in a sample bottle, acetonitrile (12 mL) was added to the resultant mixture, and the resultant solution was stirred at room temperature for 24 hours. After confirming that PEO was completely dissolved in acetonitrile, and $LiN(SO_2CF_3)_2$ was sufficiently dissolved in the solution, an electrolytic solution that was obtained was casted in a polytetrafluoroethylene schale (having a diameter of 7.5 cm). Next, the schale was transferred to a vacuum desiccator, and acetonitrile was removed by drying the electrolytic solution at 20° C. for 24 hours while flowing dry nitrogen at a flow rate of 2 L/minute to the schale, whereby an electrolyte membrane was obtained.

Reference Example C2

PEO (0.50 g) and LiN(SO$_2$CF$_3$)$_2$ (0.272 g), and a mixed solvent of EC and GBL (EC:GBL=30:70 (volume ratio)) (0.246 g) were weighed and collected in a sample bottle, acetonitrile (12 mL) was added to the resultant solution, and the solution was stirred at room temperature for 24 hours. After confirming that PEO was completely dissolved in acetonitrile, and LiN(SO$_2$CF$_3$)$_2$ was sufficiently dissolved in the solution, an electrolytic solution that was obtained was casted in a polytetrafluoroethylene schale (having a diameter of 7.5 cm). Next, the schale was transferred to a vacuum desiccator, and acetonitrile was removed by drying the electrolytic solution at 20° C. for 24 hours while flowing dry nitrogen at a flow rate of 2 L/minute to the schale, whereby an electrolyte membrane was obtained.

Reference Example C3

An electrolyte membrane was obtained by the same method as Reference Example C1 except that LiBF$_4$ (0.107 g) was used instead of LiN(SO$_2$CF$_3$)$_2$ (0.326 g).

Reference Example C4

An electrolyte membrane was obtained by the same method as Reference Example C2 except that LiBF$_4$ (0.107 g) was used instead of LiN(SO$_2$CF$_3$)$_2$ (0.272 g).

(6) Measurement of Ion Conductivity of Electrolyte Membrane

The electrolyte membrane obtained as described above was cut into the size having a diameter of 16 mm, the cut membrane was set as a measurement sample, and this sample was assembled into a cell with being interposed between stainless steel plates. Then, the cell was connected to a complex AC impedance measuring apparatus, and a resistance value was measured from Nyquist plot. At this time, the cell was put into a thermostatic bath set to 60° C. to make the electrolyte membrane and an electrode conformable with each other. Then, the temperature was lowered, and the resistance value was measured at a predetermined temperature. The resistance value at each temperature was measured after maintaining the cell at each temperature for 30 minutes. Then, from the resistance value that was obtained, ion conductivity (σ) (S/cm) of the electrolyte membrane was calculated by Expression (I) to be described below. With respect to the electrolyte membrane of Examples C1 to C8, Comparative Examples C1 to C4, and Reference Examples C1 to C4, the ion conductivity (σ) at 40° C. is shown in Table C2.

$$\sigma = 1/s \cdot R \quad (I)$$

(In the expression, 1 represents a thickness (cm) of the sample (electrolyte membrane); s represent an area (cm$^2$) of the sample (electrolyte membrane); and R represents the resistance value (Ω)).

(7) Measurement of Lithium Ion Transference Number (t+) of Electrolyte Membrane

The lithium ion transference number of the electrolyte membrane obtained as described above was obtained by combination of direct current polarization measurement and complex impedance measurement.

That is, the electrolyte membrane was cut into the size having a diameter of 17 mm, and the cut membrane was assembled into a cell with being interposed between Li plates. Then, the cell was connected to a complex AC impedance measuring apparatus, the cell was put into a thermostat bath set to 60° C. for 1 hour. Then, the temperature was changed to 40° C., and the cell was left for 1 hour, and then measurement was initiated. The measurement method was as follows. First, the complex impedance measurement was carried out to estimate a resistance value (hereinafter, abbreviated as R0). Then, the direct current polarization measurement was carried out, and after confirming that a current value became constant (hereinafter, an initial current value was abbreviated as I0, and a current value when being constant was abbreviated as Is), the complex impedance measurement was carried out again to estimate a resistance value (hereinafter, abbreviated as Rs). Then, the lithium ion transference number at 40° C. was calculated from Evance expression represented by Expression (II) to be described below. With respect to the electrolyte membrane of Examples C1 to C8, and Reference Examples C1 to C4, the lithium ion transference number (t+) is shown in Table C2. In Table 2, "-" represents not-measurement.

$$t+ = Is(\Delta V - I0 \cdot R0)/I0(\Delta V - Is \cdot Rs) \quad (II)$$

(in the expression, ΔV represents an applied voltage; R0, Rs, I0, and Is are the same as those described above)

TABLE C1

| | Lithium salt | boron compound (B)/lithium atoms (A) (molar ratio) | Total mixing components/ plasticizer (mass ratio) |
|---|---|---|---|
| Example C1 | Lithium formate | 1.00 | 100:0 |
| Example C2 | Lithium acetate | 1.00 | 100:0 |
| Example C3 | Lithium oxalate | 1.00 | 100:0 |
| Example C4 | Lithium succinate | 1.00 | 100:0 |
| Example C5 | Lithium formate | 1.00 | 100:27 |
| Example C6 | Lithium acetate | 1.00 | 100:26 |
| Example C7 | Lithium oxalate | 1.00 | 100:27 |
| Example C8 | Lithium succinate | 1.00 | 100:26 |
| Comparative Example C1 | Lithium formate | 0 | 100:0 |
| Comparative Example C2 | Lithium oxalate | 0 | 100:0 |
| Comparative Example C3 | Lithium formate | 0 | 100:31 |
| Comparative Example C4 | Lithium oxalate | 0 | 100:31 |
| Reference Example C1 | LiN(SO$_2$CF$_3$)$_2$ | 0 | 100:0 |
| Reference Example C2 | LiN(SO$_2$CF$_3$)$_2$ | 0 | 100:24 |
| Reference Example C3 | LiBF$_4$ | 0 | 100:0 |
| Reference Example C4 | LiBF$_4$ | 0 | 100:29 |

TABLE C2

| | Ion conductivity (σ) (40° C.) | Lithium ion transference number (t+) |
|---|---|---|
| Example C1 | 3.0 × 10$^{-5}$ | 0.59 |
| Example C2 | 4.5 × 10$^{-6}$ | 0.68 |
| Example C3 | 4.5 × 10$^{-6}$ | 0.64 |
| Example C4 | 2.2 × 10$^{-5}$ | 0.94 |
| Example C5 | 4.2 × 10$^{-4}$ | 0.79 |
| Example C6 | 1.8 × 10$^{-4}$ | 0.69 |

TABLE C2-continued

|  | Ion conductivity (σ) (40° C.) | Lithium ion transference number (t+) |
| --- | --- | --- |
| Example C7 | $4.2 \times 10^{-4}$ | 0.84 |
| Example C8 | $2.6 \times 10^{-4}$ | 0.91 |
| Comparative Example C1 | $3.2 \times 10^{-10}$ | — |
| Comparative Example C2 | $1.0 \times 10^{-9}$ | — |
| Comparative Example C3 | $1.9 \times 10^{-7}$ | — |
| Comparative Example C4 | $5.1 \times 10^{-7}$ | — |
| Reference Example C1 | $8.8 \times 10^{-5}$ | 0.40 |
| Reference Example C2 | $5.2 \times 10^{-4}$ | 0.42 |
| Reference Example C3 | $3.9 \times 10^{-6}$ | 0.47 |
| Reference Example C4 | $3.4 \times 10^{-4}$ | 0.41 |

From Example C1, when lithium formate and $BF_3O(C_2H_5)_2$ were mixed to the matrix polymer (C), it could be confirmed that in the electrolyte membrane, high ion conductivity and lithium ion transference number could be realized. In addition, from Examples C2 to C4, even when a different kind of organic acid lithium salt was mixed, the same result as Example C1 was obtained.

In addition, from Examples C5 to C8, when the plasticizer (D) was further mixed, it could be confirmed that the ion conductivity was further improved. The electrolyte membranes of Examples C1 to C8 had the ion conductivity equal to or greater than that of the electrolyte membranes of Reference Examples 1 to 4 that used lithium salt in the related art, and the lithium ion transference number was superior to that of Reference Examples.

On the other hand, from Comparative Example C1, it could be confirmed that $BF_3O(C_2H_5)_2$ is a mixing component that is requisite for improvement of ion conductivity of the electrolyte membrane near room temperature.

In addition, from Comparative Examples C2 to C4, even in an organic acid lithium salt having a different structure, when $BF_3O(C_2H_5)_2$ was not mixed, it could be confirmed that the ion conductivity greatly decreased. This is assumed to be because the organic acid lithium salt may not effectively dissociate. In addition, in Comparative Examples C1 to C4, since the ion conductivity was very low, the measurement of lithium ion transference number was not carried out.

(8) Preparation of Organic Acid Lithium Salt (A)
(8-1) Preparation of Lithium Formate
A white powder of lithium formate was obtained by the same method as (2-1).
(8-2) Preparation of Lithium Oxalate
A white powder of lithium formate was obtained by the same method as (4-3).
(8-3) Preparation of Lithium Succinate
A white powder of lithium succinate was obtained by the same method as (2-6).
(9) Manufacturing of Electrolyte, Electrolytic Solution, and Cell
Operations in the following examples and comparative examples were carried out in a dry box.

Example D1

<Preparation of Electrolytic Solution>
Lithium oxalate (0.284 g, 2.79 mmol) obtained in (8-2) as the (A) component, and $BF_3O(C_2H_5)_2$ (0.792 g, 5.58 mmol) as the (B) component, and GBL as the organic solvent were weighed and collected in a sample bottle, and were mixed so that a concentration of lithium atoms became 1.0 mol/kg. Then, the resultant mixture was stirred at room temperature for 24 hours, whereby an electrolytic solution was obtained.

<Manufacturing of Coin-Type Cell>
A negative electrode (manufactured by Hohsen Corporation.) and a positive electrode (manufactured by Hohsen Corporation.) were punched into a disc shape having a diameter of 16 mm. In addition, a glass fiber as a separator was punched into a disc shape having a diameter of 17 mm.

The positive electrode, the separator, and the negative electrode that were obtained were laminated in this order in an SUS battery container (CR2032), and the electrolytic solution that was obtained as described above was impregnated into the separator, the negative electrode, and the positive electrode. Furthermore, an SUS plate (having a thickness of 1.2 mm and a diameter of 16 mm) was further mounted on the negative electrode, and the battery container was covered with a lid, whereby a coin-type cell was manufactured.

Example D2

An electrolytic solution and a coin-type cell were manufactured by the same method as Example D1 except that the electrolytic solution was manufactured by using PC instead of GBL as the organic solvent.

Example 3

An electrolytic solution and a coin-type cell were manufactured by the same method as Example D1 except that the electrolytic solution was manufactured by using a mixed solvent of EC and GBL (EC:GBL=30:70 (volume ratio)) instead of GBL as the organic solvent.

Example D4

An electrolytic solution and a coin-type cell were manufactured by the same method as Example D1 except that the electrolytic solution was manufactured by using a mixed solvent of EC and PC (EC:PC=30:70 (volume ratio)) instead of GBL as the organic solvent.

Example D5

An electrolytic solution and a coin-type cell were manufactured by the same method as Example D1 except that the electrolytic solution was manufactured by using a mixed solvent of EMC and GBL (EMC:GBL=50:50 (volume ratio)) instead of GBL as the organic solvent.

Example D6

An electrolytic solution and a coin-type cell were manufactured by the same method as Example D1 except that the electrolytic solution was manufactured by using a mixed solvent of EMC and PC (EMC:PC=50:50 (volume ratio)) instead of GBL as the organic solvent.

Example D7

<Manufacturing of Electrolyte Solution>
Lithium oxalate (0.183 g, 1.80 mmol) obtained in (8-2) as the (A) component, and $BF_3O(C_4H_9)_2$ (0.712 g, 3.60 mmol) as the (B) component, and a mixed solvent of EMC and GBL (EMC:GBL=50:50 (volume ratio)) as a nonaqueous solvent were weighed and collected in a sample bottle, and were mixed so that a concentration of lithium atoms became 1.0 mol/kg. Then, the resultant mixture was stirred at room temperature for 24 hours, whereby an electrolytic solution was obtained.

<Manufacturing of Coin-Type Cell>

A coin-type cell was manufactured in the same manner as Example D1 except that the above-described electrolytic solution was used.

Example D8

<Manufacturing of Electrolytic Solution>

Lithium oxalate (0.170 g, 1.67 mmol) obtained in (8-2) as the (A) component, and $BF_3OC_4H_8$ (0.467 g, 3.34 mmol) as the (B) component, and a mixed solvent of EMC and GBL (EMC:GBL=50:50 (volume ratio)) as a nonaqueous solvent were weighed and collected in a sample bottle, and were mixed so that a concentration of lithium atoms became 1.0 mol/kg. Then, the resultant mixture was stirred at room temperature for 24 hours, whereby an electrolytic solution was obtained.

<Manufacturing of Coin-Type Cell>

A coin-type cell was manufactured in the same manner as Example D1 except that the above-described electrolytic solution was used.

Example D9

<Manufacturing of Electrolytic Solution>

Lithium formate (0.174 g, 3.35 mmol) obtained in (8-1) as the (A) component, and $BF_3O(C_2H_5)_2$ (0.475 g, 3.35 mmol) as the (B) component, and a mixed solvent of EMC and GBL (EMC:GBL=50:50 (volume ratio)) as a nonaqueous solvent were weighed and collected in a sample bottle, and were mixed so that the concentration of lithium atoms became 1.0 mol/kg. Then, the resultant mixture was stirred at room temperature for 24 hours, whereby an electrolytic solution was obtained.

<Manufacturing of Coin-Type Cell>

A coin-type cell was manufactured in the same manner as Example D1 except that the above-described electrolytic solution was used.

Example D10

<Manufacturing of Electrolytic Solution>

Lithium succinate (0.221 g, 1.70 mmol) obtained in (8-3) as the (A) component, and $BF_3O(C_2H_5)_2$ (0.483 g, 3.41 mmol) as the (B) component, and a mixed solvent of EMC and GBL (EMC:GBL=50:50 (volume ratio)) as a nonaqueous solvent were weighed and collected in a sample bottle, and were mixed so that the concentration of lithium atoms became 1.0 mol/kg. Then, the resultant mixture was stirred at room temperature for 24 hours, whereby an electrolytic solution was obtained.

<Manufacturing of Coin-Type Cell>

A coin-type cell was manufactured in the same manner as Example D1 except that the above-described electrolytic solution was used.

Comparative Example D1

<Manufacturing of Electrolytic Solution>

$LiPF_6$ (0.807 g, 5.31 mmol) as the other components (the organic acid lithium salt (A) and the boron compound (B) were not used), and GBL as a nonaqueous solvent were weighed and collected in a sample bottle, and were mixed so that the concentration of lithium atoms became 1.0 mol/kg, whereby an electrolytic solution was obtained.

<Manufacturing of Coin-Type Cell>

A coin-type cell was manufactured in the same manner as Example D1 except that the above-described electrolytic solution was used.

Comparative Example D2

An electrolytic solution and a coin-type cell were manufactured by the same method as Comparative Example D1 except that the electrolytic solution was manufactured by using PC instead of GBL as the organic solvent.

Comparative Example D3

An electrolytic solution and a coin-type cell were manufactured by the same method as Comparative Example D1 except that the electrolytic solution was manufactured by using a mixed solvent of EC and GBL (EC:GBL=30:70 (volume ratio)) instead of GBL as the organic solvent.

Comparative Example D4

An electrolytic solution and a coin-type cell were manufactured by the same method as Comparative Example D1 except that the electrolytic solution was manufactured by using a mixed solvent of EC and PC (EC:PC=30:70 (volume ratio)) instead of GBL as the organic solvent.

Comparative Example D5

An electrolytic solution and a coin-type cell were manufactured by the same method as Comparative Example D1 except that the electrolytic solution was manufactured by using a mixed solvent of EMC and GBL (EMC:GBL=50:50 (volume ratio)) instead of GBL as the organic solvent.

Comparative Example D6

An electrolytic solution and a coin-type cell were manufactured by the same method as Comparative Example D1 except that the electrolytic solution was manufactured by using a mixed solvent of EMC and PC (EMC:PC=50:50 (volume ratio)) instead of GBL as the organic solvent.

(6) Evaluation of Battery Performance

With respect to the coin-type cells of Example D1 to D10, and Comparative Examples D1 to D6, constant current and constant voltage charging of 0.2 C at 25° C. was carried out until a current value converged to 0.1 C with the upper limit voltage set to 4.2 V, and then constant current discharging of 0.2 C was carried out up to 2.7 V. Then, the charging and discharging current was set to 1 C, and the charging and discharging cycle was repetitively carried out by the same method several times to several tens of times to stabilize a battery state. Then, the charging and discharging current was set to 1 C, and the charging and discharging cycle was repetitively carried out by the same method to calculate a capacity retention rate after 100 cycles (discharging capacity (mAh) at the $100^{th}$ cycle/discharging capacity (mAh) at the $1^{th}$ cycle)×100. In addition, in a case where 100 cycles of charging and discharging test was impossible, the number of cycles when the capacity retention rate was 80% (described as "80% (the number of cycles)) and the number of cycles when the capacity retention rate was 50% (described as "50% (the number of cycles)) are shown. In addition, when the capacity decreased to a half or less within 5 cycles, it was determined that "charging and discharging was impossible." Results are shown in Table D1.

TABLE D1

| | Organic acid lithium salt (A)-boron compound | Solvent | Ratio of solvent | Capacity retention rate |
|---|---|---|---|---|
| Example D1 | Lithium oxalate-$BF_3O(C_2H_5)_2$ | GBL | 100 | 96% |
| Example D2 | Lithium oxalate-$BF_3O(C_2H_5)_2$ | PC | 100 | 98% |
| Example D3 | Lithium oxalate-$BF_3O(C_2H_5)_2$ | GBL:EC | 70:30 | 98% |
| Example D4 | Lithium oxalate-$BF_3O(C_2H_5)_2$ | PC:EC | 70:30 | 98% |
| Example D5 | Lithium oxalate-$BF_3O(C_2H_5)_2$ | GBL:EMC | 50:50 | 93% |
| Example D6 | Lithium oxalate-$BF_3O(C_2H_5)_2$ | PC:EMC | 50:50 | 96% |
| Example D7 | Lithium oxalate-$BF_3O(C_4H_9)_2$ | GBL:EMC | 50:50 | 98% |
| Example D8 | Lithium oxalate-$BF_3OC_4H_8$ | GBL:EMC | 50:50 | 86% |
| Example D9 | Lithium formate-$BF_3O(C_2H_5)_2$ | GBL:EMC | 50:50 | 88% |
| Example D10 | Lithium succinate-$BF_3O(C_2H_5)_2$ | GBL:EMC | 50:50 | 72% |
| Comparative Example D1 | $LiPF_6$ | GBL | 100 | 80% (2 cycles) 50% (7 cycles) |
| Comparative Example D2 | $LiPF_6$ | PC | 100 | Charging and discharging are impossible |
| Comparative Example D3 | $LiPF_6$ | GBL:EC | 70:30 | 80% (39 cycles) 50% (50 cycles) |
| Comparative Example D4 | $LiPF_6$ | PC:EC | 70:30 | Charging and discharging are impossible |
| Comparative Example D5 | $LiPF_6$ | GBL:EMC | 50:50 | Charging and discharging are impossible |
| Comparative Example D6 | $LiPF_6$ | PC:EMC | 50:50 | Charging and discharging are impossible |

As is clear from the results of Examples D1 to D6, when lithium oxalate of the (A) component was mixed in combination with $BF_3O(C_2H_5)_2$ of the (B) component, even when as a nonaqueous solvent, cyclic carbonic acid esters such as propylene carbonate having a branched chain or lactones such as γ-butyrolactone was contained as a solvent, sufficient charging and discharging characteristics (cycle lifetime characteristics) were shown.

In addition, as is clear from the results of Examples D7 and D8, even in a case where a boron compound having a different structure was mixed as the (B) component, the same results as Examples D1 to D6 were obtained.

In addition, as is clear from the results of Examples D9 and D10, even in a case where organic acid lithium having a different structure was mixed as the (A) component, the same results as Examples D1 to D8 were obtained.

On the other hand, as is clear from the results of Comparative Example D1 to D6, in a case where $LiPF_6$ was used as a lithium salt, satisfactory charging and discharging behavior was not shown. The reason is because the electrolytic solution does not contain the (A) component and the (B) component.

INDUSTRIAL APPLICABILITY

The invention may be used in a field of electric devices. For example, the invention may be used in wide fields such as a capacitor, a lithium ion secondary battery, an in-house storage secondary battery, and a storage secondary battery for a vehicle.

REFERENCE SIGNS LIST

1: Lithium ion secondary battery
11: Positive electrode
12: Electrolyte membrane
13: Negative electrode
14: Case
15: Insulating gasket
16: Cap

The invention claimed is:

1. A lithium ion secondary battery comprising an electrolytic solution which is a mixture of an organic acid lithium salt (A), a boron compound (B) and an organic solvent (C),
said organic acid lithium salt (A) being lithium oxalate,
said boron compound (B) being at least one member selected from the group consisting of boron trifluoride and boron trifluoride complex,
wherein the number of moles of lithium atoms in the organic acid lithium salt (A):the number of moles of the boron compound (B) is 100:80 to 100:106 (molar ratio), and
wherein a concentration of lithium atoms (Li) in the electrolytic solution is 0.2 to 3.0 mol/kg, in terms of [number of moles (mol) of lithium atoms in the organic acid lithium salt (A)/total mixed amount (kg) of (the organic acid lithium salt (A)+the boron compound (B)+the solvent (C))].

2. The lithium ion battery according to claim 1, wherein the organic solvent (C) is one or more kinds selected from the group consisting of a carbonic acid ester compound, a lactone compound, an ether compound, a carboxylic acid ester compound, a nitrile compound, an amide compound, and sulfone compound.

3. The lithium ion battery according to claim 1, wherein the organic solvent (C) is one or more kinds selected from the group consisting of a carbonic acid ester compound and a lactone compound.

4. The lithium ion battery according to claim 3, wherein the carbonic acid ester compound is propylene carbonate and the lactone compound is γ-butyrolactone.

5. The lithium ion battery according to claim 1, which further comprises a matrix polymer (D).

* * * * *